US011394883B2

(12) United States Patent
Nguyen et al.

(10) Patent No.: US 11,394,883 B2
(45) Date of Patent: Jul. 19, 2022

(54) METHOD FOR PROVIDING PANORAMIC IMAGES AND ELECTRONIC DEVICE SUPPORTING THE SAME

(71) Applicant: Samsung Electronics Co., Ltd., Suwon-si (KR)

(72) Inventors: Dang Tung Nguyen, Bac Ninh province (VN); Van Manh Le, Bac Ninh province (VN); Anh Tuan Nguyen, Bac Ninh province (VN); Ngoc Duc Ngo, Bac Ninh province (VN); Minh Thanh Nguyen, Bac Ninh province (VN); Xuan Tai Ngo, Bac Ninh province (VN); Cong Duy Dinh, Bac Ninh province (VN); Minh Khang Do, Bac Ninh province (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/213,721

(22) Filed: Mar. 26, 2021

(65) Prior Publication Data

US 2021/0368099 A1    Nov. 25, 2021

(30) Foreign Application Priority Data

May 21, 2020   (KR) .................... 10-2020-0061159

(51) Int. Cl.
*H04N 5/232*   (2006.01)
*G06F 3/14*   (2006.01)
(Continued)

(52) U.S. Cl.
CPC ....... *H04N 5/23238* (2013.01); *G06F 3/1423* (2013.01); *G06T 3/40* (2013.01); *H04N 5/2252* (2013.01); *H04N 5/23206* (2013.01)

(58) Field of Classification Search
CPC ............ H04N 5/23238; H04N 5/2252; H04N 5/23206; G06F 3/1423; G06T 3/40
(Continued)

(56) References Cited

U.S. PATENT DOCUMENTS

| 2014/0098188 | A1* | 4/2014 | Kwak | G06F 3/1423 348/38 |
|---|---|---|---|---|
| 2017/0094168 | A1* | 3/2017 | Kang | G06F 1/1677 |
| 2020/0382702 | A1* | 12/2020 | Oberdoerster | H04N 5/2259 |

FOREIGN PATENT DOCUMENTS

CN    110392212 A    10/2019

* cited by examiner

*Primary Examiner* — Joseph G Ustaris
*Assistant Examiner* — Matthew David Kim
(74) *Attorney, Agent, or Firm* — Jefferson IP Law, LLP

(57) ABSTRACT

An electronic device including first and second housings rotated on a hinge unit, a display exposed to an outside through the first and second housings, first and second cameras disposed respectively in the first and second housings, at least one sensor, and at least one processor, is provided. The at least one processor is configured to obtain first and second images using the first camera and second cameras, respectively, generate a first panoramic image based on the first and second images, detect a rotation of at least one of the first housing or the second housing through the hinge unit using the at least one sensor, obtain at least one image using at least one of the first or second cameras while the at least one housing rotates, and generate a second panoramic image based on the first panoramic image and the at least one image.

17 Claims, 15 Drawing Sheets

(51) Int. Cl.
*G06T 3/40* (2006.01)
*H04N 5/225* (2006.01)

(58) Field of Classification Search
USPC .......................................................... 348/38
See application file for complete search history.

METHOD FOR PROVIDING PANORAMIC IMAGES AND ELECTRONIC DEVICE SUPPORTING THE SAME

CROSS-REFERENCE TO RELATED APPLICATION(S)

This application is based on and claims priority under 35 U.S.C. § 119(a) of a Korean patent application number 10-2020-0061159, filed on May 21, 2020, in the Korean Intellectual Property Office, the disclosure of which is incorporated by reference herein in its entirety.

BACKGROUND

1. Field

The disclosure relates to a method for providing panoramic images and electronic devices supporting the same.

2. Description of the Related Art

Electronic devices (e.g., mobile terminals) provide various functions, such as camera functions. The electronic devices may generate (or obtain) a panoramic image using the images acquired through a camera. The panoramic image may be an image generated by combining (e.g., stitching) a plurality of images.

Recently, electronic devices including a foldable display have been developed. The foldable display-equipped electronic device may be carried in a folded state, providing enhanced portability.

The above information is presented as background information only to assist with an understanding of the disclosure. No determination has been made, and no assertion is made, as to whether any of the above might be applicable as prior art with regard to the disclosure.

SUMMARY

The electronic device generates panoramic images using one camera. For example, the electronic device obtains a plurality of images through one camera while being carried by the user and generates a panoramic image using the plurality of images obtained.

It may take a long time to obtain the plurality of images. While the plurality of images are obtained, the user's hand holding the electronic device may be shaken, so that at least some of the images may be blurred.

Aspects of the disclosure are to address at least the above-mentioned problems and/or disadvantages and to provide at least the advantages described below. Accordingly, an aspect of the disclosure is to provide a method for providing a panoramic image, which obtains a plurality of images using a plurality of cameras included in an electronic device with a foldable display and provide (e.g., generate) a panoramic image using the plurality of images and an electronic device for supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first housing including a first surface facing in a first direction and a second housing including a second surface facing in a second direction, a hinge unit for rotating the first housing and the second housing, a display exposed to an outside through the first surface of the first housing and the second surface of the second housing, a first camera disposed in the first housing to obtain an image through a third surface of the first housing facing in a direction opposite to the first direction, a second camera disposed in the second housing to obtain an image through a fourth surface of the second housing facing in a direction opposite to the second direction, at least one sensor, and at least one processor operatively connected to the display, the first camera, the second camera, and the at least one sensor. The at least one processor may be configured to obtain a 1-1th (or first) image using the first camera and a 2-1th (or second) image using the second camera, generate a first panoramic image based on the 1-1th image and the 2-1th image, detect a rotation of at least one of the first housing or the second housing through the hinge unit using the at least one sensor, obtain at least one image using at least one of the first camera or the second camera while the at least one housing rotates, and generate a second panoramic image based on the first panoramic image and the at least one image.

In accordance with another aspect of the disclosure, a method for providing a panoramic image by an electronic device is provided. The method includes obtaining a 1-1th image using a first camera disposed in a first housing of the electronic device and a 2-1th image using a second camera disposed in a second housing of the electronic device, the electronic device including the first housing and the second housing rotated through a hinge unit and a display exposed to an outside through the first housing and the second housing, generating a first panoramic image based on the 1-1th image and the 2-1th image, detecting a rotation of at least one of the first housing or the second housing on the hinge unit using at least one sensor of the electronic device, obtaining at least one image using at least one of the first camera or the second camera while the at least one housing rotates, and generating a second panoramic image based on the first panoramic image and the at least one image.

According to various embodiments, a method for providing a panoramic image and electronic device for supporting the same may obtain a plurality of images using a plurality of cameras included in an electronic device with a foldable display and provide a panoramic image using the plurality of images.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
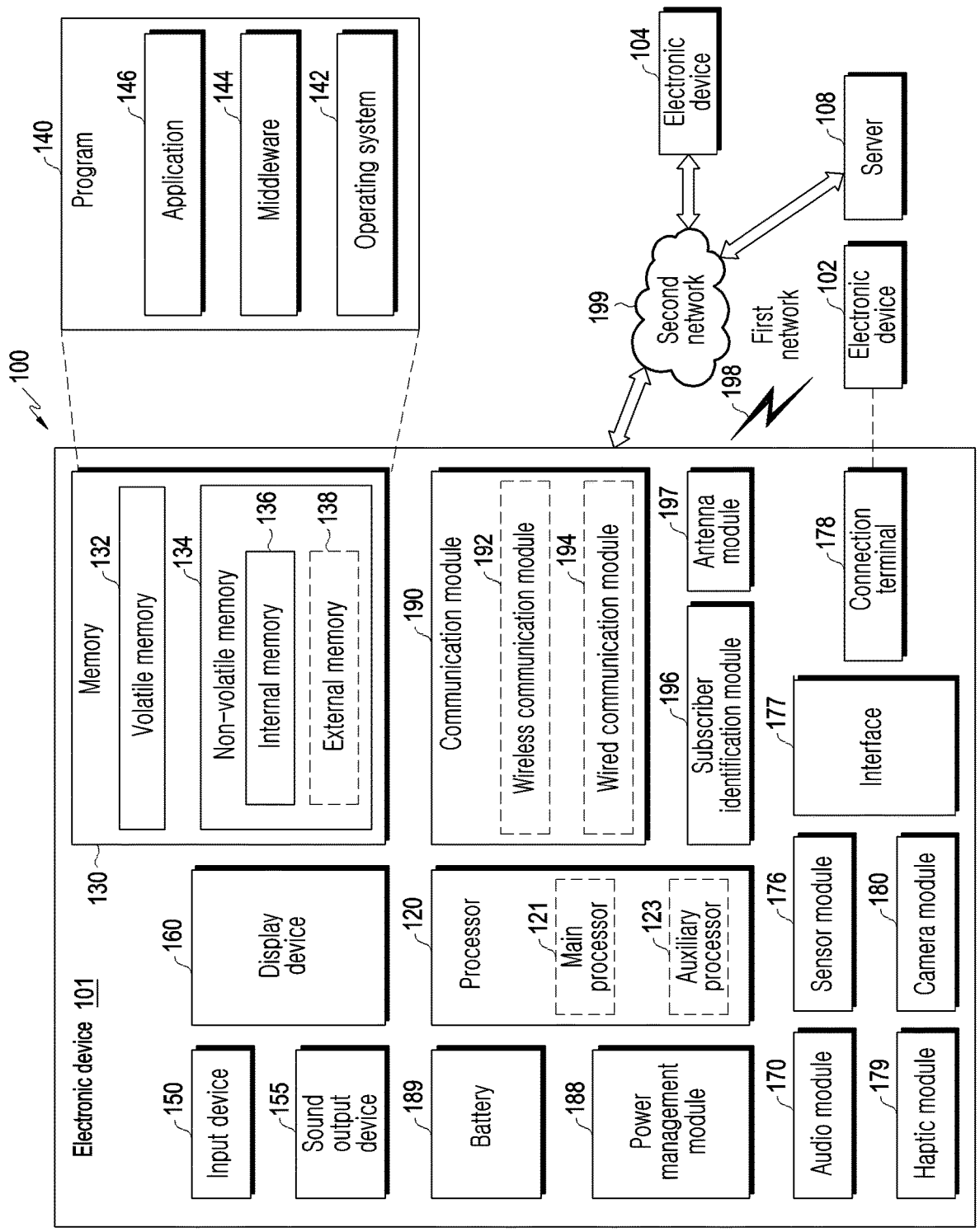
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., an external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
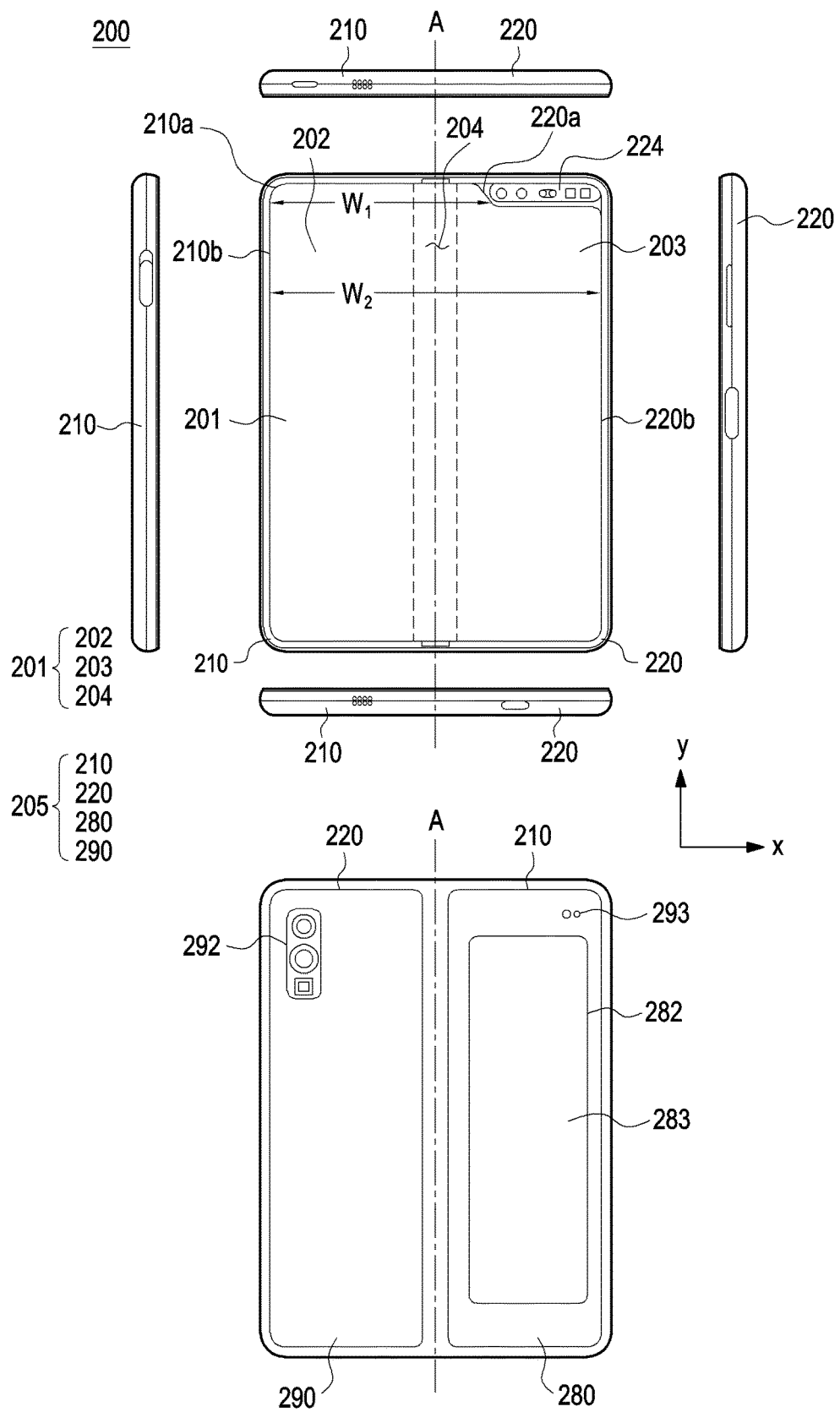
FIG. 2A is a view illustrating an unfolded state of an electronic device according to an embodiment of the disclosure.

FIG. 2A is a view illustrating an unfolded state of an electronic device according to an embodiment of the disclosure.

Figure 2B:
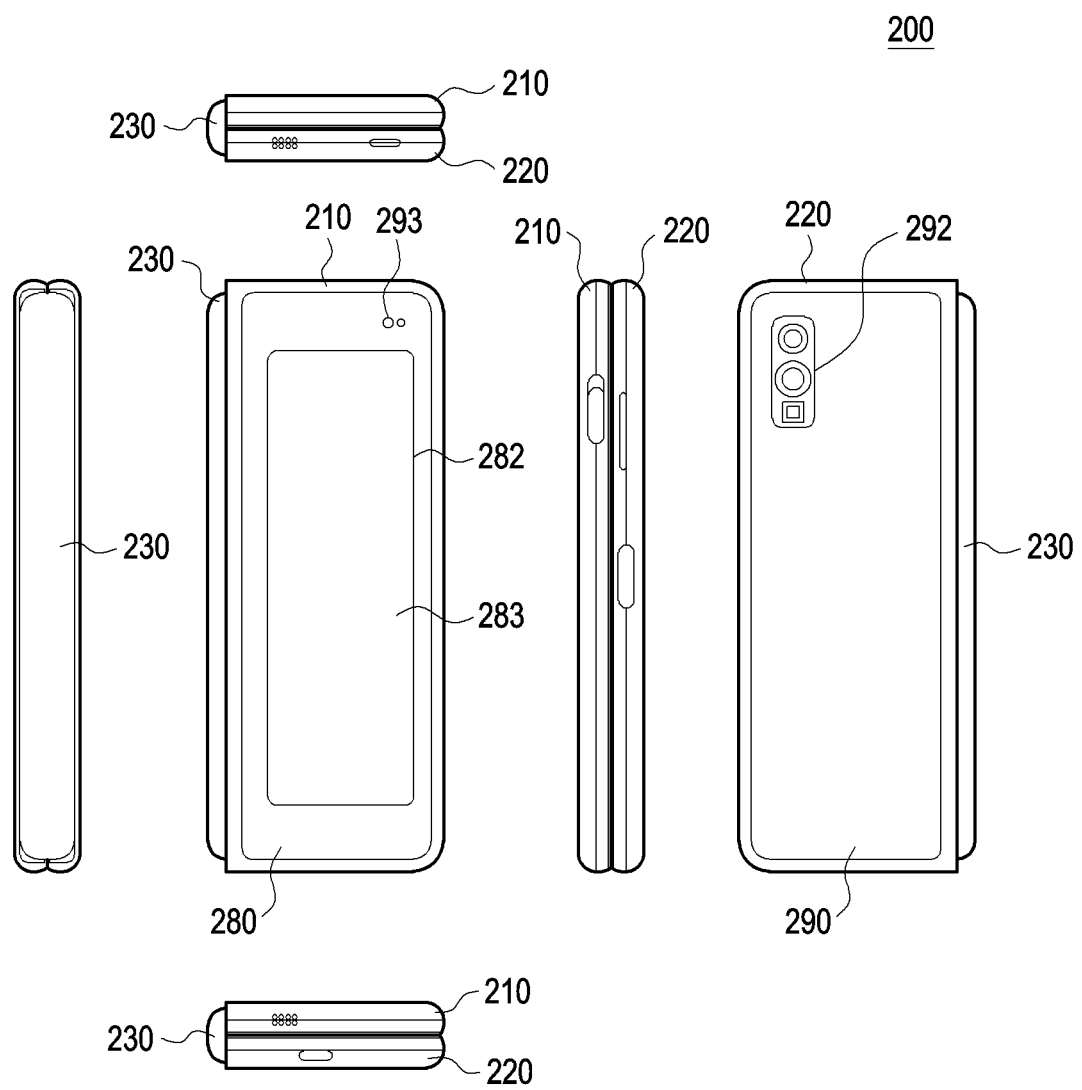
FIG. 2B is a view illustrating a folded state of an electronic device according to an embodiment of the disclosure.

FIG. 2B is a view illustrating a folded state of an electronic device according to an embodiment of the disclosure.

Referring to FIGS. 2A and 2B, according to an embodiment, an electronic device 200 may include a foldable housing 205, a hinge cover 230 covering a foldable portion of the foldable housing 205, and a flexible or foldable display 201 (hereinafter, simply "display" 201) disposed in a space formed by the foldable housing 205. In the disclosure, the surface where the display 201 is disposed is defined as a front surface of the electronic device 200. Further, the surface on which the display 201 is disposed in the first housing 210 is referred to as a first surface, and the surface opposite to the first surface in the first housing 210 is referred to as a third surface. Further, the opposite surface of the front surface is defined as a rear surface of the electronic device 200. Further, the surface on which the display 201 is disposed in the second housing 220 is referred to as a second surface, and the surface opposite to the second surface in the second housing 220 is referred to as a fourth surface. The surface surrounding the space between the front and rear surfaces is defined as a side surface of the electronic device 200.

According to an embodiment, the foldable housing 205 may include a first housing 210, a second housing 220 including a sensor area 224, a first rear cover 280, and a second rear cover 290. The foldable housing 205 of the electronic device 200 are not limited to the shape and coupling shown in FIGS. 2A and 2B but may rather be implemented in other shapes or via a combination and/or coupling of other components. For example, in another embodiment, the first housing 210 and the first rear cover 280 may be integrally formed with each other, and the second housing 220 and the second rear cover 290 may be integrally formed with each other.

In the illustrated embodiment, the first housing 210 and the second housing 220 may be positioned on opposite sides of a folding axis (axis A), and they may be overall symmetrical in shape with each other with respect to the folding axis A. The terms "first housing 210" and "second housing 220" are interchangeably used with the terms "first housing" and "second housing," respectively. As set forth below, the first housing 210 and the second housing 220 may have different angles or distances formed therebetween depending on whether the electronic device 200 is in an unfolded, folded, or intermediate state. In the illustrated embodiment, the first housing 210 and the second housing 220 may be symmetrical in shape except that the second housing 220 further includes the sensor area 224 where various sensors are arranged, unlike the first housing 210. According to an embodiment, although it is illustrated that the sensor area 224 is disposed on the second surface of the second housing 220 in FIG. 2A, the disclosure is not limited thereto. For example, an area through which components capable of performing various functions of the electronic device 101 may be exposed may be disposed on the first surface of the first housing 210.

According to an embodiment, as shown in FIG. 2A, the first housing 210 and the second housing 220 together may form a recess to receive the display 201. In the illustrated embodiment, due to the sensor area 224, the recess may have two or more different widths in the direction perpendicular to the folding axis A.

For example, the recess 1 may have a first width w1 between a first portion 210a, parallel with the folding axis A, of the first housing 210, and a first portion 220a, formed at an edge of the sensor area 224, of the second housing 220 and a second width w2 formed by a second portion 210b of the first housing 210 and a second portion 220b, which is parallel with the folding axis A and does not correspond to the sensor area 224, of the second housing 220. In this case, the second width w2 may be longer than the first width w1. In other words, the first portion 210a of the first housing 210 and the first portion 220a of the second housing 220, which are asymmetrical with each other, may form the first width w1 of the recess, and the second portion 210b of the first housing 210 and the second portion 220b of the second housing 220, which are symmetrical with each other, may form the second width w2 of the recess. In an embodiment, the first portion 220a and second portion 220b of the second housing 220 may have different distances from the folding axis A. The width of the recess is not limited thereto. According to various embodiments, the recess may have a plurality of widths due to the shape of the sensor area 224 or the asymmetric portions of the first housing 210 and the second housing 220. In the above-described example, the recess for receiving the display 201 is illustrated, but embodiments of the disclosure are not limited thereto. For example, in place of, or in addition to, the recess or sensor area 224, components (e.g., cameras) may perform functions through holes or notches related to the display 201 (e.g., a punch hole display or notch display). As another example, in addition to or in place of the recess or sensor area 224, the components may be disposed under (or behind) the display 201.

In an embodiment, the first housing 210 and the second housing 220 may at least partially be formed of a metal or non-metallic material with a rigidity selected to support the display 201.

In an embodiment, the sensor area 224 may be formed adjacent to a corner of the second housing 220 and to have a predetermined area. However, the placement, shape, or size of the sensor area 224 is not limited to those illustrated. For example, in another embodiment, the sensor area 224 may be provided in a different corner of the second housing 220 or in any area between the top corner and the bottom corner. In an embodiment, components for performing various functions, embedded in the electronic device 200, may be exposed through the sensor area 224 or one or more openings in the sensor area 224 to the front surface of the electronic device 200. According to an embodiment, the components may include various kinds of sensors. According to an embodiment, at least some of the components may be embedded within the display 201. The sensor may include, e.g., at least one of a camera, a receiver, an illumination sensor, or a proximity sensor.

The first rear cover 280 may be disposed on one side of the folding axis on the rear surface of the electronic device and have a substantially rectangular periphery which may be surrounded by the first housing 210. Similarly, the second rear cover 290 may be disposed on the opposite side of the folding axis on the rear surface of the electronic device and its periphery may be surrounded by the second housing 220.

In the illustrated embodiment, the first rear cover 280 and the second rear cover 290 may be substantially symmetrical in shape with respect to the folding axis (axis A). However, the first rear cover 280 and the second rear cover 290 are not necessarily symmetrical in shape. In another embodiment, the electronic device 200 may include the first rear cover 280 and the second rear cover 290 in various shapes. In another embodiment, the first rear cover 280 may be integrally formed with the first housing 210, and the second rear cover 290 may be integrally formed with the second housing 220.

In an embodiment, a combined structure of the first rear cover 280, the second rear cover 290, the first housing 210, and the second housing 220 may form a space where various components (e.g., a printed circuit board or battery) of the electronic device 200 may be disposed. According to an embodiment, one or more components may be arranged or visually exposed on/through the rear surface of the electronic device 200. For example, at least a portion of a sub display 283 may be visually exposed through a first rear surface area 282 of the first rear cover 280. According to an embodiment, at least part of at least one sensor 293 (e.g., an image sensor) may be visually exposed through the first rear surface area 282 of the first rear cover 280.

In another embodiment, one or more components or sensors may be visually exposed through a second rear surface area 292 of the second rear cover 290. According to various embodiments, the sensor may include a proximity sensor and/or a camera.

Referring to FIG. 2B, the hinge cover 230 may be disposed between the first housing 210 and the second housing 220 to hide the internal components (e.g., the hinge structure). According to an embodiment, the hinge cover 230 may be hidden by a portion of the first housing 210 and second housing 220 or be exposed to the outside depending on the state (e.g., the unfolded state or folded state) of the electronic device 200.

For example, as shown in FIG. 2A, in the unfolded state of the electronic device 200, the hinge cover 230 may be hidden, and thus not exposed, by the first housing 210 and the second housing 220. By way of example, as shown in FIG. 2B, in the folded state (e.g., the fully folded state) of the electronic device 200, the hinge cover 230 may be exposed to the outside between the first housing 210 and the second housing 220. As an example, in an intermediate state in which the first housing 210 and the second housing 220 are folded with a certain angle, the hinge cover 230 may be partially exposed to the outside between the first housing 210 and the second housing 220. In this case, however, the exposed area may be smaller than in the fully folded state. According to an embodiment, the hinge cover 230 may include a curved surface.

Hereinafter, a component which allows the first housing 210 and the second housing 220 to rotate on each other, including the hinge cover 230, is referred to as a hinge unit (not shown). For example, the first housing 210 and the second housing 220 may be connected through the hinge unit. The first housing 210 and the second housing 220 may be connected pivotably or rotatably about (or with respect to) the hinge unit.

The display 201 may be disposed on a space formed by the foldable housing 205. For example, the display 201 may be seated on a recess formed by the foldable housing 205 and may occupy most of the front surface of the electronic device 200.

Thus, the front surface of the electronic device 200 may include the display 201 and a partial area of the first housing 210 and a partial area of the second housing 220, which are adjacent to the display 201. The rear surface of the electronic device 200 may include the first rear cover 280, a partial area of the first housing 210, which is adjacent to the first rear cover 280, the second rear cover 290, and a partial area of the second housing 220, which is adjacent to the second rear cover 290.

The display 201 may mean a display at least a portion of which may be transformed to be flat or curved. According to an embodiment, the display 201 may include a folding area 204, a first area 202 disposed on one side of the folding area 204 (e.g., the left side of the folding area 204 of FIG. 2A), and a second area 203 disposed on the opposite side of the folding area 204 (e.g., the right side of the folding area 204 of FIG. 2A).

The segmentation of the display 201 as shown in FIG. 2A is merely an example, and the display 201 may be divided into a plurality of (e.g., four or more, or two) areas depending on the structure or function of the display 201. As an example, in the embodiment illustrated in FIG. 2A, the area of the display 201 may be segmented by the folding area 204 or folding axis (axis A) extending in parallel with the y axis but, in another embodiment, the display 201 may also be segmented with respect to other folding area (e.g., a folding area parallel with the x axis) or other folding axis (e.g., a folding axis parallel with the x axis).

The first area 202 and the second area 203 may be overall symmetrical in shape with respect to the folding area 204. However, unlike the first area 202, the second area 203 may include a notch depending on the presence of the sensor area 224, but the rest may be symmetrical in shape with the first area 202. In other words, the first area 202 and the second area 203 may include symmetrical portions and asymmetrical portions. However, the disclosure is not limited thereto, and the first area 202 may include a sensor area that is the same as or similar to the sensor area 224 of the second area 203 and in which components (e.g., a camera or a sensor) may be disposed.

Described below are the operation of the first housing 210 and the second housing 220 and each area of the display 201 depending on the state (e.g., the unfolded state (flat state) and folded state) of the electronic device 200.

According to an embodiment, when the electronic device 200 is in the unfolded state (flat state) (e.g., FIG. 2A), the first housing 210 and the second housing 220 may be angled at 180 degrees therebetween, facing in the same direction. The surface of the first area 202 and the surface of the second area 203 of the display 201 may be angled at 180 degrees therebetween while facing in the same direction (e.g., forward of the front surface of the electronic device). The folding area 204 may be coplanar with the first area 202 and the second area 203.

According to an embodiment, when the electronic device 200 is in the folded state (e.g., FIG. 2B), the first housing 210 and the second housing 220 may be disposed to face each other. The surface of the first area 202 and the surface of the second area 203 of the display 201 may be angled at a small angle (e.g., ranging from 0 degrees to 10 degrees) therebetween while facing each other. At least a portion of the folding area 204 may have a curved surface with a predetermined curvature.

According to an embodiment, when the electronic device 200 is in an intermediate state, the first housing 210 and the second housing 220 may be angled therebetween at a certain angle. The surface of the first area 202 of the display 201 and the surface of the second area 203 may form an angle which is larger than the angle in the folded state and smaller than the angle in the unfolded state. The folding area 204 may at least partially have a curved surface with a predetermined curvature and, in this case, the curvature may be smaller than that when it is in the folded state.

Figure 2C:
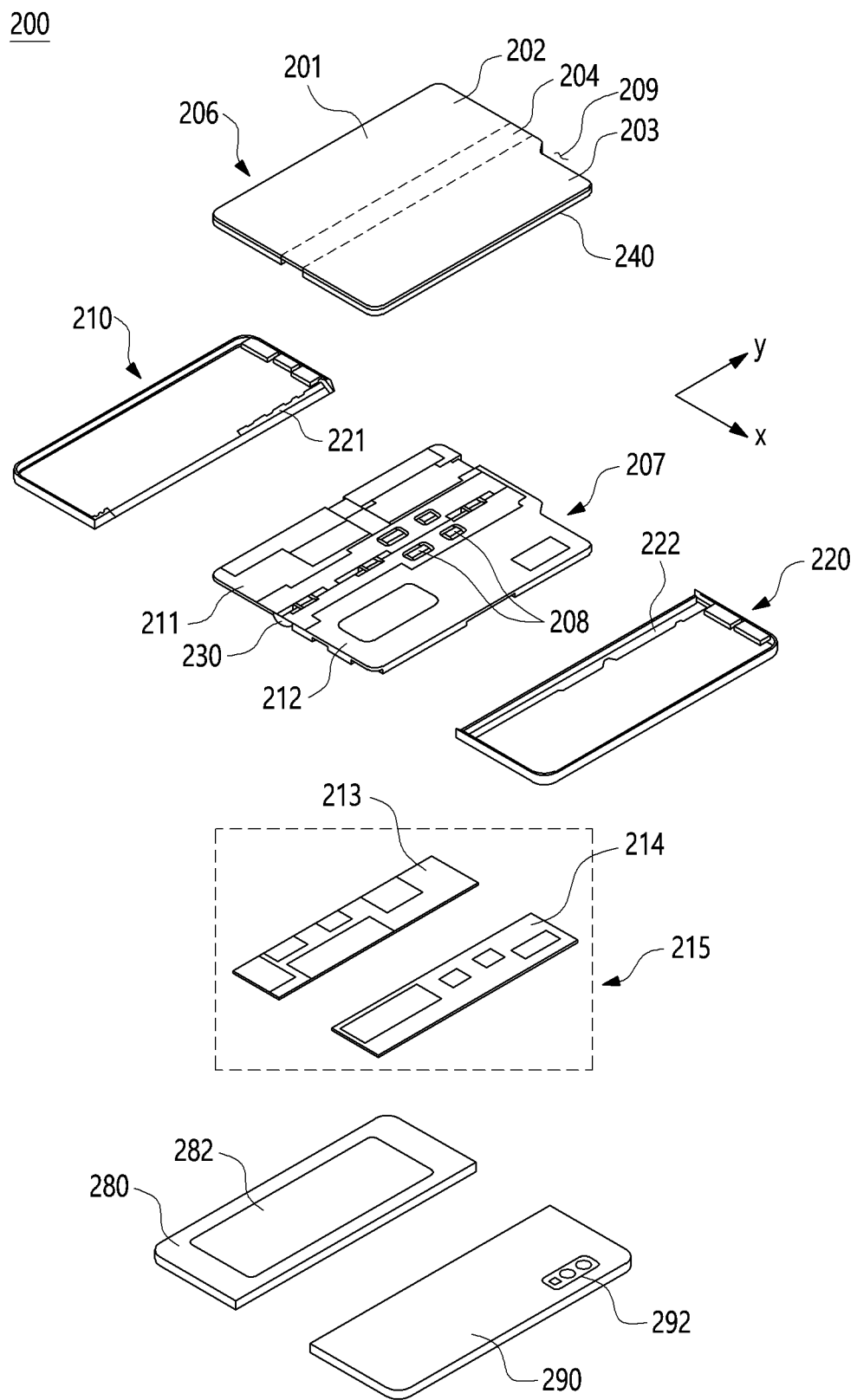
FIG. 2C is an exploded perspective view illustrating an electronic device according to an embodiment of the disclosure.

FIG. 2C is an explosive perspective view illustrating an electronic device according to an embodiment of the disclosure.

Referring to FIG. 2C, according to an embodiment, an electronic device 200 may include a display unit 206, a bracket assembly 207, a circuit board unit 215, a first housing 210, a second housing 220, a first rear cover 280, and a second rear cover 290. In the disclosure, the display unit 206 may be referred to as a display module or display assembly.

The display unit 206 may include a display 201 and one or more plates or layers 240 on which the display 201 is seated. According to an embodiment, the plate 240 may be disposed between the display panel 201 and the bracket assembly 207. The display 201 may be disposed on at least a portion of one surface (e.g., an upper surface of FIG. 2C) of the plate 240. The plate 240 may be formed in a shape corresponding to the display 201. For example, a portion of the plate 240 may be formed in a shape corresponding to the notch 209 of the display 201.

The bracket assembly 207 may include a first bracket 211, a second bracket 212, a hinge structure disposed between the first bracket 211 and the second bracket 212, a hinge cover 230 covering the hinge structure when the hinge structure is viewed from the outside, and a wiring member 208 (e.g., a flexible printed circuit board (FPCB)) crossing the first bracket 211 and the second bracket 212.

In an embodiment, the bracket assembly 207 may be disposed between the plate 240 and the circuit board unit 215. As an example, the first bracket 211 may be disposed between the first area 202 of the display 201 and a first circuit board 213. The second bracket 212 may be disposed between the second area 203 of the display 201 and a second circuit board 214.

According to an embodiment, the wiring member and the hinge structure may be at least partially disposed inside the bracket assembly 207. The wiring member 208 may be disposed in a direction (e.g., the x-axis direction) crossing the first bracket 211 and the second bracket 212. The wiring member 208 may be disposed in a direction (e.g., the x-axis direction) perpendicular to the folding axis (e.g., the folding axis A of FIG. 2A or the y axis) of the folding area 204 of the electronic device 200.

As mentioned above, the circuit board unit 215 may include the first circuit board 213 disposed on the first bracket 211 and the second circuit board 214 disposed on the second bracket 212. The first circuit board 213 and the second circuit board 214 may be disposed inside a space formed by the bracket assembly 207, the first housing 210, the second housing 220, the first rear cover 280, and the second rear cover 290. Components for implementing various functions of the electronic device 200 may be mounted on the first circuit board 213 and the second circuit board 214.

The first housing 210 and the second housing 220 may be assembled together to be coupled to both sides of the bracket assembly 207, with the display unit 206 coupled to the bracket assembly 207. As described below, the first housing 210 and the second housing 220 may slide from both sides of the bracket assembly 207 and fit with the bracket assembly 207.

According to an embodiment, the first housing 210 may include a first rotation supporting surface 221, and the second housing 220 may include a second rotation supporting surface 222 corresponding to the first rotation supporting surface 221. The first rotation supporting surface 221 and the second rotation supporting surface 222 may include a curved surface corresponding to a curved surface included in the hinge cover 230.

According to an embodiment, the first rotation supporting surface 221 and the second rotation supporting surface 222, in the unfolded state of the electronic device 200 (e.g., the electronic device of FIG. 2A), may cover the hinge cover 230, allowing the hinge cover 230 to be not or minimally exposed to the rear surface of the electronic device 200. The first rotation supporting surface 221 and the second rotation supporting surface 222, in the folded state of the electronic device 200 (e.g., the electronic device of FIG. 2B), may rotate along the curved surface included in the hinge cover 230, allowing the hinge cover 230 to be exposed to the rear surface of the electronic device 200.

Figure 3:
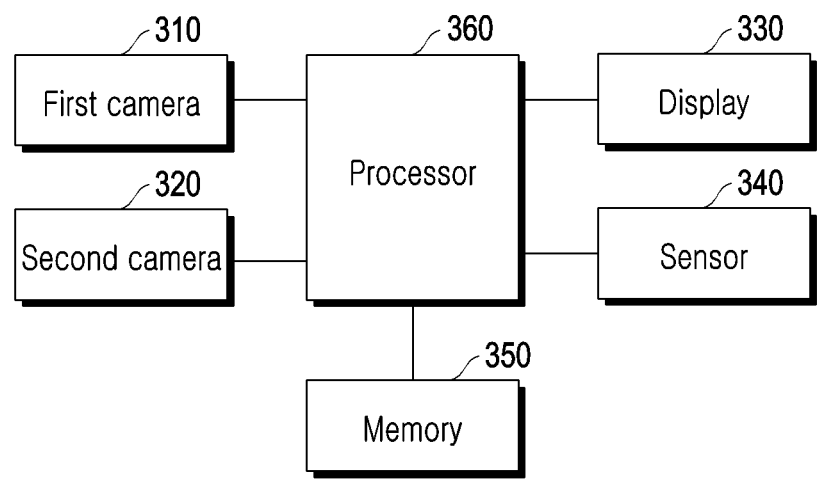
FIG. 3 is a block diagram illustrating an electronic device according to an embodiment of the disclosure.

FIG. 3 is a block diagram illustrating an electronic device 101 according to an embodiment of the disclosure.

Referring to FIG. 3, according to an embodiment, an electronic device 101 may include a first camera 310, a second camera 320, a display 330, a sensor 340, a memory 350, and a processor 360.

According to an embodiment, the electronic device 101 may be an electronic device that is at least partially identical or similar to the electronic device 101 of FIGS. 2A to 2C. For example, although not illustrated in FIG. 3, the electronic device 101 may further include a foldable housing 205 and a hinge unit as described above in connection with FIGS. 2A to 2C. As another example, the electronic device 101 may include at least some of the components included in the electronic device 101 of FIGS. 2A to 2C.

In an embodiment, the first camera 310 may be a camera capable of obtaining an image through the third surface of the first housing 210. For example, the first camera 310 may be a camera capable of obtaining an image through the third surface opposite to the first surface where the display 330 (corresponding to display 201 of FIG. 2A) is disposed in the first housing 210. The first camera 310 may be included in at least one sensor 293 that is visually exposed through the first rear surface area 282 of the first rear cover 280.

According to an embodiment, the second camera 320 may be a camera capable of obtaining an image through the fourth surface of the second housing 220. For example, the second camera 320 may be a camera capable of obtaining an image through the fourth surface opposite to the second surface where the display 330 is disposed in the second housing 220. The second camera 320 may be included in at least one sensor 293 that is visually exposed through the second rear surface area 292 of the second rear cover 290.

Although not illustrated in FIG. 3, in an embodiment, the electronic device 101 may further include at least one camera in addition to the first camera 310 and the second camera 320. For example, the electronic device 101 may include, in addition to the first camera 310 and the second camera 320, at least one camera capable of obtaining an image through at least one of the first surface of the first housing 210 or the second surface of the second housing 220, where the display 330 is disposed.

According to an embodiment, the display 330 may have the same configuration as the foldable display 201 of FIGS. 2A to 2C. Hereinafter, an area including the first area 202 of the display 330 and an area adjacent to the first area 202 with respect to the folding axis (axis A) of the folding area 204 (e.g., an area contacting or continuous from the first area 202) is denoted as a 'first portion of the display 330.' An area including the second area 203 of the display 330 and an area adjacent to the second area 203 with respect to the folding axis (axis A) of the folding area 204 (e.g., an area contacting or continuous from the second area 203) is denoted as a 'second portion of the display 330.'

According to an embodiment, the sensor 340 may include a sensor 340 (hereinafter, a 'first sensor') capable of detecting an angle (hereinafter, a 'folding angle') formed by the first housing 210 and the second housing 220.

According to an embodiment, when at least one of the first housing 210 or the second housing 220 rotates about the hinge unit (e.g., with respect to the hinge unit or the folding axis (axis A)), the first sensor may detect the folding angle (and/or folding direction) formed by the first housing 210 and the second housing 220. According to an embodiment, the first sensor may include at least one of a hall sensor, a load cell, an infrared sensor, a pressure sensor, an electromagnetic sensor, an acceleration sensor, a gyro sensor, or a geomagnetic sensor. However, the first sensor for detecting the folding angle is not limited to the above example.

According to an embodiment, when the first housing 210 or the second housing 220 is rotated about the hinge unit, the sensor 340 may include a sensor (hereinafter, a 'second sensor') for detecting the rotation angle (and/or rotation direction) (hereinafter, a 'first rotation angle') of the first housing 210 or a sensor (hereinafter, a 'third sensor') for detecting the rotation angle (and/or rotation direction) (hereinafter, a 'second rotation angle') of the second housing 220. For example, the second sensor may be disposed in the first housing 210 to detect the position (e.g., the spatial position) (or a posture) of the first housing 210. When the first housing 210 is rotated with respect to the hinge unit, the processor 360 may detect the first rotation angle based on the change in the position of the first housing 210 obtained through the second sensor. As another example, the third sensor may be disposed in the second housing 220 to detect the position of the second housing 220. When the second housing 220 is rotated with respect to the hinge unit, the processor 360 may detect the second rotation angle based on the change in the position of the second housing 220 obtained through the third sensor. According to an embodiment, the first sensor and the second sensor, each, may include at least one of a hall sensor, a load cell, an infrared sensor, a pressure sensor, an electromagnetic sensor, an acceleration sensor, a gyro sensor, or a geomagnetic sensor. In the above-described example, although the sensor 340 is illustrated as including only one of the second sensor and the third sensor in addition to the first sensor, embodiments of the disclosure are not limited thereto. For example, the sensor 340 may include all of the first sensor, the second sensor, and the third sensor.

In an embodiment, the memory 350 may be at least partially identical or similar in configuration to the memory 130 of FIG. 1. In an embodiment, the memory 350 may store various pieces of information for implementing a method for providing a panoramic image.

According to an embodiment, the processor 360 may be at least partially identical or similar in configuration to the processor 120 of FIG. 1. In an embodiment, the processor 360 may control operations for providing a panoramic image.

Operations for providing a panoramic image performed under the control of the processor 360 are described below in detail with reference to FIGS. 4 to 13.

Although not illustrated in FIG. 3, in an embodiment, the electronic device 101 may further include a driving unit (e.g., a motor) for rotating the first housing 210 and the second housing 220 with respect to the hinge unit. A method in which the electronic device 101 provides a panoramic image using the driving unit is described below in detail with reference to FIG. 13.

According to an embodiment, an electronic device 101 comprises a housing including a first housing including a first surface facing in a first direction and a second housing including a second surface facing in a second direction, a hinge unit for rotating the first housing and the second housing, a display exposed to an outside through the first surface of the first housing and the second surface of the second housing, a first camera disposed in the first housing to obtain an image through a third surface of the first housing facing in a direction opposite to the first direction, a second camera disposed in the second housing to obtain an image through a fourth surface of the second housing facing in a direction opposite to the second direction, at least one sensor, and at least one processor operatively connected to the display, the first camera, the second camera, and the at least one sensor. The at least one processor may be configured to obtain a 1-1th image using the first camera and a 2-1th image using the second camera, generate a first panoramic image based on the 1-1th image and the 2-1th image, detect a rotation of at least one of the first housing or the second housing on the hinge unit using the at least one sensor, obtain at least one image using at least one of the first camera or the second camera while the at least one housing rotates, and generate a second panoramic image based on the first panoramic image and the at least one image.

According to an embodiment, the at least one processor 360 may be configured to identify overlapping areas between the 1-1th image and the 2-1th image in the 1-1th image and the 2-1th image, and generate the first panoramic image based on the overlapping areas.

According to an embodiment, the at least one processor 360 may be configured to obtain a 1-2th (or third) image using the first camera 310 and a 2-2th (or fourth) image using the second camera 320 upon detecting that a folding angle formed between the first housing 210 and the second housing 220 is changed by a designated angle using the at least one sensor.

According to an embodiment, the at least one processor 360 may be configured to set the designated angle to allow a first overlapping area between the first panoramic image and the 1-2th image and a second overlapping area between the first panoramic image and the 2-2th image to have a designated size.

According to an embodiment, the at least one processor 360 may be configured to obtain the at least one image via a housing rotated by a designated angle, of the first housing 210 and the second housing 220, upon detecting that the first housing 210 or the second housing 220 is rotated on the hinge unit by the designated angle using the at least one sensor 340.

According to an embodiment, the at least one processor 360 may be configured to obtain a first temporary image using the first camera 310 and a second temporary image using the second camera 320, select one of the first temporary image and the second temporary image, and adjust a setting of a camera obtaining a non-selected of the first temporary image and the second temporary image, of the first camera 310 and the second camera 320, to allow an attribute of the non-selected image of the first temporary image and the second temporary image to be identical to an attribute of the selected temporary image.

According to an embodiment, the at least one processor 360 may be configured to obtain feature points matched between the 1-1th image and the 2-1th image, and output information to guide to increase a folding angle formed between the first housing 210 and the second housing 220 to be larger than a current folding angle upon identifying that the number of the feature points is less than a predetermined number.

According to an embodiment, the at least one processor 360 may be configured to detect a rotation speed at which the first housing 210 or the second housing 220 rotates on the hinge unit, via the at least one sensor 340, and output information to guide to rotate a housing rotating at a speed higher than a designated speed, of the first housing 210 and the second housing 220, at a speed lower than a current rotation speed.

According to an embodiment, the electronic device may further comprise a driving unit for rotating the first housing 210 and the second housing 220. The at least one processor 360 may be configured to obtain at least one image using at least one of the first camera 310 and the second camera 320 while the first housing 210 and the second housing 220 are rotated by the driving unit.

According to an embodiment, the at least one processor 360 may be configured to terminate obtaining the at least one image when the at least one housing is rotated in a direction opposite to the direction of the rotation on the hinge unit or when the first housing 210 and the second housing 220 are fully folded.

Figure 4:
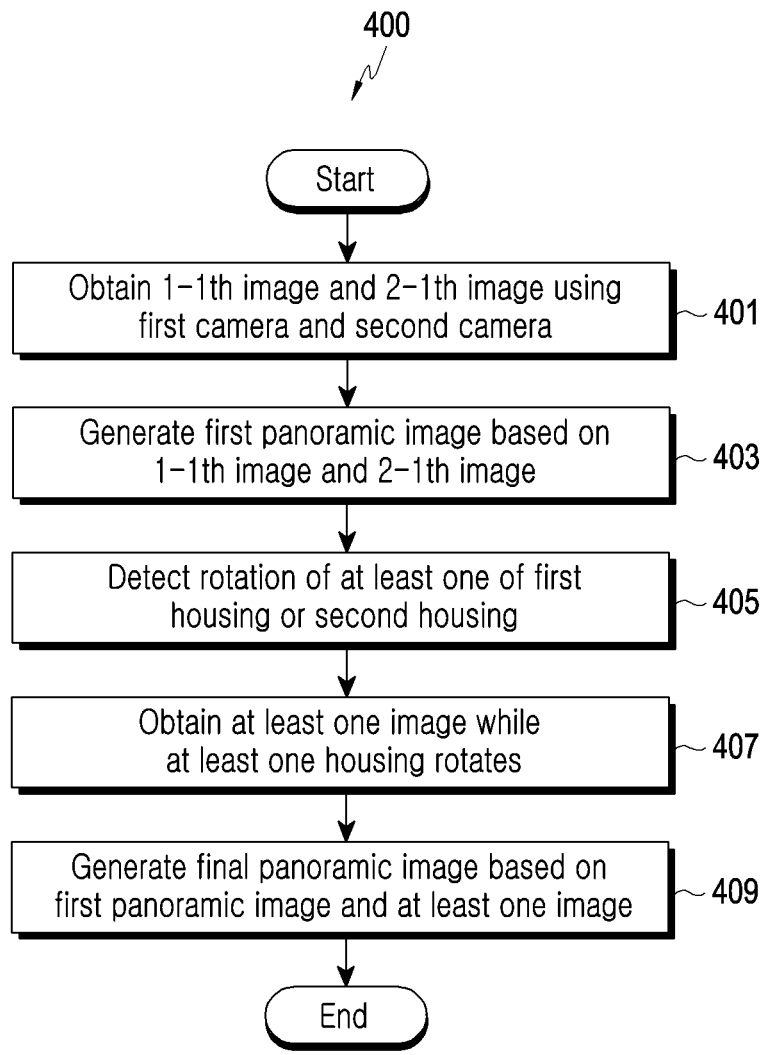
FIG. 4 is a flowchart illustrating a method for providing a panoramic image according to an embodiment of the disclosure.

FIG. 4 is a flowchart 400 illustrating a method for providing a panoramic image according to an embodiment of the disclosure.

Referring to FIG. 4, according to an embodiment, the processor 360 may obtain a 1-1th image and a 2-1th image using the first camera 310 and the second camera 320 in operation 401. For example, the processor 360 may obtain the 1-1th image using the first camera 310 and the 2-1th image using the second camera 320.

According to an embodiment, the 1-1th image and the 2-1th image may denote images to be first combined (e.g., stitched) (e.g., images as bases of a first panoramic image) to generate a final panoramic image (e.g., a panoramic image to be finally generated).

In an embodiment, the processor 360 may obtain the 1-1th image and the 2-1th image in response to an input for generating a panoramic image. After the camera function is executed, the processor 360 may receive an input for generating a panoramic image from the user. For example, after the camera function is executed, the processor 360 may receive a user input to allow the electronic device 101 to operate in (or enter) a mode (hereinafter, a 'panorama mode') in which a panoramic image may be generated. According to an embodiment, in response to the input for generating a panoramic image, the processor 360 may obtain a plurality of first images (e.g., a plurality of first raw image frames) using the first camera 310 and a plurality of second images (e.g., a plurality of second raw image frames) using the second camera 320. The processor 360 may obtain the 1-1th image based on at least one of the plurality of first images (e.g., by selecting one from among the plurality of first images or synthesizing some of the plurality of first images) and obtain the 2-1th image based on at least one of the plurality of second images (e.g., by selecting one from among the plurality of second images or synthesizing some of the plurality of second images).

According to an embodiment, after receiving the input for generating a panoramic image, the processor 360 may obtain the 1-1th image and the 2-1th image in response to detection of a rotation of at least one of the first housing 210 or the second housing 220 with respect to the hinge unit (e.g., in response to detection of a folding of the foldable housing 205) using the sensor 340. For example, after receiving the input for generating a panoramic image, the processor 360 may detect a folding (e.g., starting to fold) of at least one of the first housing 210 or the second housing 220 with respect to the hinge unit based on the information obtained from the sensor 340 (e.g., at least one of the first sensor, the second sensor, or the third sensor). In response to detection of a folding of the at least one housing with respect to the hinge unit (e.g., at the time when the at least one housing folds), the processor 360 may obtain the 1-1th image via the first camera 310 and the 2-1th image via the second camera 320.

However, the method for obtaining the 1-1 image and the 2-1 image is not limited to the above-described examples.

According to an embodiment, the processor 360 may obtain a plurality of first images through the first camera 310 in response to the input for generating a panoramic image and display, in real-time, a first preview image based on the plurality of obtained first images through the first portion of the display 330. According to an embodiment, the processor 360 may obtain a plurality of second images through the second camera 320 in response to the input for generating a panoramic image and display, in real-time, a second preview image based on the plurality of obtained second images through the second portion of the display 330.

According to an embodiment, while the electronic device 101 operates in the panorama mode, the processor 360 may display the first preview image and the second preview image through the first portion and second portion, respectively, of the display 330. In an embodiment, the processor 360 may display the first preview image and the second preview image through the display 330 until a final panoramic image is generated.

In operation 403, according to an embodiment, the processor 360 may generate a first panoramic image based on the 1-1th image and the 2-1th image. For example, the processor 360 may obtain the first panoramic image by combining the 1-1th image and the 2-1th image.

A method for generating the first panoramic image based on the 1-1th image and the 2-1th image by the processor 360 is described below in detail with reference to FIG. 5.

Figure 5:
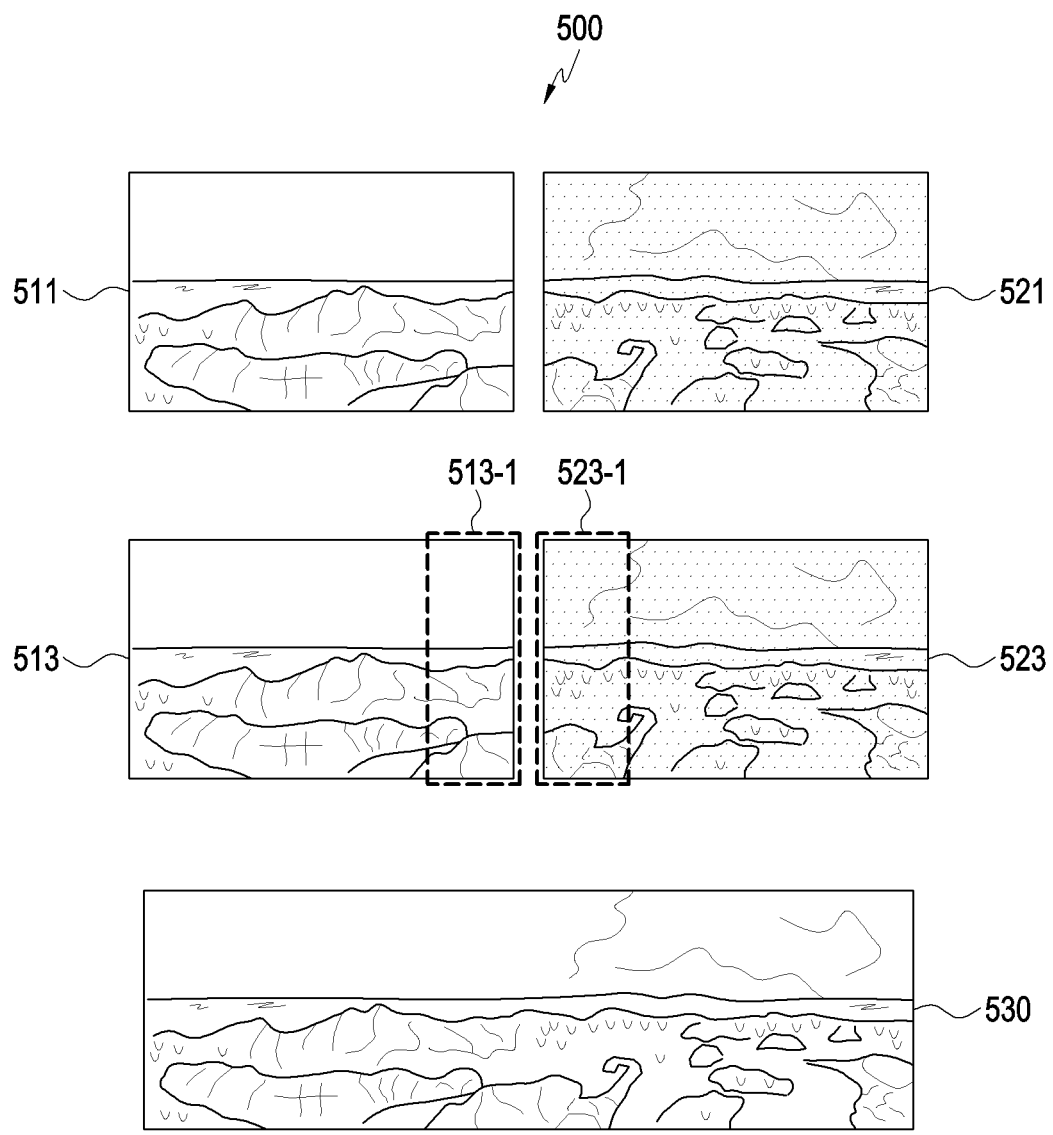
FIG. 5 is a view illustrating a method for generating a first panoramic image according to an embodiment of the disclosure.

FIG. 5 is a view 500 illustrating a method for generating a first panoramic image according to an embodiment of the disclosure.

Referring to FIG. 5, according to an embodiment, the processor 360 may obtain a 1-1th image 511 using the first camera 310 and a 2-1th image 521 using a second camera 320.

According to an embodiment, the processor 360 may identify an overlapping area between the 1-1th image 511 and the 2-1th image 521. The processor 360 may identify an image portion for the same scene (e.g., a portion of the image captured for the same scene) in the 1-1th image 511 and the 2-1th image 521 as the overlapping area. For example, the processor 360 may identify a first overlapping area 513-1 in the 1-1th image 513 and a second overlapping area 523-1 in the 2-1th image 523.

According to an embodiment, the processor 360 may identify the overlapping area (e.g., the first overlapping area and the second overlapping area) based on the folding angle (e.g., the folding angle at the time of obtaining the 1-1th image and the 2-1th image), the field-of-view (FOV) of the first camera 310, the FOV of the second camera 320, a distance (e.g., the shortest distance) between the first camera 310 and the folding axis (axis A), and a distance between the second camera 320 and the folding axis.

In an embodiment, the processor 360 may obtain features (e.g., a plurality of feature points) in the 1-1th image and the 2-1th image. For example, the processor 360 may use a scale invariant feature transform (SIFT) algorithm or a speeded up robust features (SURF) algorithm to obtain features in each of the first overlapping area 513-1 of the 1-1th image 513 and the second overlapping area 523-1 of the 2-1th image 523.

In an embodiment, the processor 360 may match the features obtained in the 1-1th image and the features obtained in the 2-1th image. For example, the processor 360 may use a random sample consensus (RANSAC) algorithm to obtain a homography matrix indicating the relationship (e.g., a transformation relationship) between the features extracted from the 1-1th image 513 and the features extracted from the 2-1th image 523.

According to an embodiment, the processor 360 may warp (or distort) at least one of the 1-1th image 513 or the 2-1th image 523 by performing a perspective transform using the obtained homography matrix.

In an embodiment, the processor 360 may blend the 1-1th image and the 2-1th image. For example, the processor 360 may blend the first overlapping area 513-1 of the 1-1th image 513 and the second overlapping area of the 2-1th image 523-1 using a liner blending algorithm or a multi-band blending algorithm.

According to an embodiment, the processor 360 may generate a first panoramic image by performing the above-described operations (e.g., identifying the first overlapping area and the second overlapping area, obtaining features in the first overlapping area and the second overlapping area, obtaining a homography matrix, warping at least one of the 1-1th image or the 2-1th image, and blending the 1-1th image and the 2-1th image) on the 1-1th image and the 2-1th image. For example, the processor 360 may generate a first panoramic image 530 based on the 1-1th image and the 2-1th image.

Although FIG. 5 illustrates an example in which the processor 360 performs the operations of identifying the first overlapping area and the second overlapping area, obtaining features in the first overlapping area and the second overlapping area, obtaining a homography matrix, warping at least one of the 1-1th image or the 2-1th image, and blending the 1-1th image and the 2-1th image to generate the first panoramic image based on the 1-1th image and the 2-1th image, embodiments of the disclosure are not limited thereto. For example, the processor 360 may use other various methods or various algorithms than the above-described operations to generate the first panoramic image based on the 1-1th image and the 2-1th image.

Although not illustrated in FIG. 5, in an embodiment, the processor 360 may crop at least one of the 1-1th image and the 2-1th image to generate a first panoramic image having a designated size.

In an embodiment, when the first panoramic image is generated, the processor 360 may display the generated first panoramic image through the display 330. According to an embodiment, the processor 360 may display the generated first panoramic image through the display 330 while displaying the first preview image being obtained in real-time using the first camera 310 through the first portion of the display 330 and the second preview image being obtained in real-time using the second camera 320 through the second portion of the display 330. For example, the processor 360 may display the first panoramic image together with the first preview image and the second preview image through the display 330 (e.g., a partial area of the display 330).

Returning to FIG. 4, in operation 405, the processor 360 may detect a rotation of at least one of the first housing 210 or the second housing 220 with respect to the hinge unit using the sensor 340 (e.g., at least one of the first sensor, the second sensor, or the third sensor), according to an embodiment. For example, the processor 360 may detect at least one of the change in the folding angle formed by the first housing 210 and the second housing 220, the first rotation angle of the first housing 210, or the second rotation angle of the second housing 220 using the sensor 340 while at least one of the first housing 210 or the second housing 220 is folded on the hinge unit.

According to an embodiment, while at least one of the first housing 210 or the second housing 220 is rotated with respect to the hinge, the direction in which the field-of-view of at least one of the first camera 310 or the second camera 320 faces may be changed.

Figure 6:
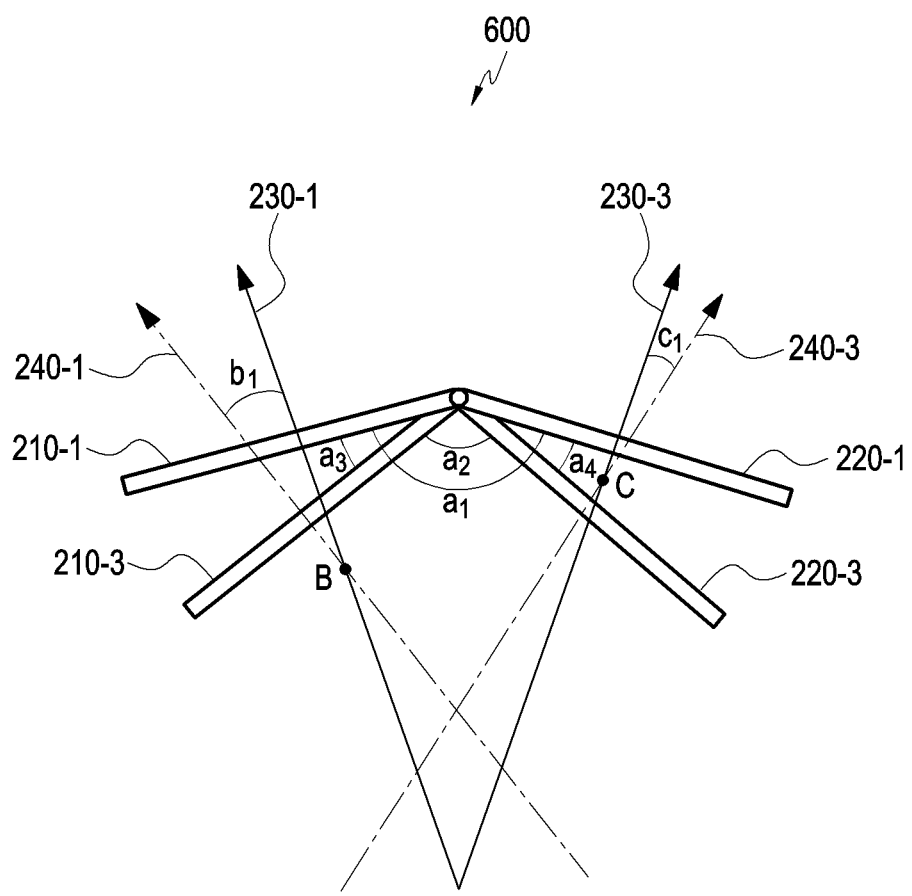
FIG. 6 is a view illustrating a relationship between a rotation of at least one of a first housing or a second housing and a direction in which a field-of-view of at least one of a first camera or a second camera faces, according to an embodiment of the disclosure.

FIG. 6 is a view 600 illustrating a relationship between the rotation of at least one of a first housing 210 or the second housing 220 and a direction in which a field-of-view of at least one of the first camera 310 or the second camera 320 faces, according to an embodiment of the disclosure.

Referring to FIG. 6, in one embodiment, reference numerals 210-1 and 220-1, respectively, denote the position of the first housing 210 and the position of the second housing 220 at a first time (e.g., a first time point). Reference numerals 210-3 and 220-3, respectively, may denote the position of the first housing 210 and the position of the second housing 220 at a second time after the first time.

The folding angle at the first time may be represented by a1, and the folding angle at the second time may be represented by a2. While time passes from the first time to the second time, the first rotation angle in which the first housing 210 is rotated may be represented by a3, and the second rotation angle in which the second housing 220 is rotated may be represented by a4.

A 1-1th arrow 230-1 and a 2-1th arrow 230-3, respectively, may denote the direction in which the field-of-view of the first camera 310 faces at the first time (e.g., the direction in which the center of the field-of-view faces) and the direction in which the field-of-view of the second camera 320 faces at the first time. A 1-2th arrow 240-1 and a 2-2th arrow 240-3, respectively, may denote the direction in which the field-of-view of the first camera 310 faces at the second time and the direction in which the field-of-view of the second camera 320 faces at the second time. Points B and C may respectively denote the intersection between the 1-1th arrow 230-1 and the 1-2th arrow 240-1 and the intersection between the 2-1th arrow 230-3 and the 2-2th arrow 240-3.

In an embodiment, the angle b1 formed by the 1-1th arrow 230-1 and the 1-2th arrow 240-1 may denote the change in the direction in which a first field-of-view of the first camera 310 faces while time passes from the first time to the second time. The angle c1 formed by the 2-1th arrow 230-3 and the 2-2th arrow 240-3 may denote the change in the direction in which a second field-of-view of the second camera 320 faces while time passes from the first time to the second time.

According to an embodiment, from a geometrical point of view, the change b1 in the direction in which the first field-of-view of the first camera 310 faces may be identical to the first rotation angle a3, and the change c1 in the direction in which the first field-of-view of the first camera 310 faces may be identical to the second rotation angle a4. Thus, the change b1 in the direction in which the first field-of-view of the first camera 310 faces may be detected by detecting the first rotation angle a3, and the change c1 in the direction in which the second field-of-view of the second camera 320 faces may be detected by detecting the second rotation angle a4.

In an embodiment, the processor 360 may detect the change in the folding angle, the first rotation angle, and the second rotation angle using the first sensor and the second sensor (or the third sensor). For example, the processor 360 may detect the folding angle a1 at the first time and the folding angle a2 at the second time using the first sensor. The processor 360 may detect the first rotation angle a3 of the first housing 210 using the second sensor. The processor 360 may calculate the second rotation angle a4 by subtracting the first rotation angle a3 and the folding angle a2 at the second time from the folding angle a1 at the first time. As described above, since the processor 360 may detect the change in folding angle, the first rotation angle, and the second rotation angle using the first sensor and the second sensor (or the third sensor), the electronic device 101 may include the first sensor and may further include one of the second sensor or the third sensor so as to detect the change in folding angle, the first rotation angle, and the second rotation angle.

Returning to FIG. 4, in operation 407, after generating the first panoramic image, the processor 360 may obtain at least one image using at least one of the first camera 310 or the second camera 320 while at least one of the first housing 210 or the second housing 220 rotates on the hinge unit, according to an embodiment.

According to an embodiment, when the change in folding angle is a designated angle or more, the processor 360 may obtain an image using the first camera 310 and may obtain an image using the second camera 320. For example, the processor 360 may continuously obtain an image using the second camera 320 while simultaneously obtaining an image using the first camera 310 whenever the folding angle is changed by a designated angle while at least one of the first housing 210 or the second housing 220 is folded on the hinge unit.

According to an embodiment, when the rotation angle of the first housing 210 or the rotation angle of the second housing 220 is a designated angle or more, the processor 360 may obtain an image using the camera which obtains an image and is disposed on the housing, which has been rotated by a designated angle or more, of the first housing 210 and the second housing 220. For example, when the rotation angle of the first housing 210 is a designated angle or more, and the rotation angle of the second housing 220 is less than a designated angle, the processor 360 may obtain an image using the first camera 310 without obtaining an image using the second camera 320. As another example, when the rotation angle of the second housing 220 is a designated angle or more, and the rotation angle of the first housing 210 is less than a designated angle, the processor 360 may obtain an image using the second camera 320 without obtaining an image using the first camera 310. However, embodiments of the disclosure are not limited thereto. For example, when the rotation angle of one of the first housing 210 and the second housing 220 is a designated angle or more, the processor 360 may obtain images using both the first camera 310 and the second camera 320.

According to an embodiment, the processor 360 may obtain an image using the camera, which obtains an image through the surface of the housing rotated by a designated angle or more of the first housing 210 and the second housing 220, continuously whenever the rotation angle of the first housing 210 or the rotation angle of the second housing 220 becomes a designated angle. However, without limitations thereto, the processor 360 may continuously obtain images using the first camera 310 and the second camera 320 whenever the rotation angle of one of the first housing 210 and the second housing 220 becomes a designated angle.

According to an embodiment, the processor 360 may set a designated angle at which the camera obtains an image so that an overlapping area with a designated size (e.g., area) occurs between images continuously obtained. For example, the processor 360 may set a designated angle to allow the overlapping area between the first panoramic image and a 1-2th image to be obtained via the first camera 310 and the overlapping area between the first panoramic image and a 2-2th image to be obtained via the second camera 320 to have a designated size when the change in folding angle becomes a designated angle after the first panoramic image is generated. The processor 360 may set a designated angle to allow the overlapping area between the 1-2th image and a 1-3th image to be obtained via the first camera 310 and the overlapping area between the 2-2th image and a 2-3th image to be obtained via the second camera 320 to have a designated size when the change in folding angle becomes a designated angle after the 1-2th image and the 2-2th image are obtained. Although embodiments for setting a designated angle related to the change in folding angle are described above, the description may apply likewise to embodiments for setting a designated angle related to the first rotation angle and second rotation angle of the first housing 210.

In operation 409, according to an embodiment, the processor 360 may generate a final panoramic image based on the first panoramic image and at least one image.

According to an embodiment, the processor 360 may generate a panoramic image whenever obtaining an image using at least one of the first camera 310 or the second camera 320 after the first panoramic image is generated. For example, after generating the first panoramic image, the processor 360 may obtain the 1-2th image through the first camera 310 and the 2-2th image through the second camera 320. The processor 360 may generate a second panoramic image based on the first panoramic image, the 1-2th image, and the 2-2th image. After generating the second panoramic image, the processor 360 may obtain the 1-3th image through the first camera 310 and the 2-3th image through the second camera 320 after the second panoramic image is generated. The processor 360 may generate a third panoramic image based on the second panoramic image, the 1-3th image, and the 2-3th image. Upon receiving an input to terminate the operation of obtaining an image after generating the third panoramic image, the processor 360 may determine that the third panoramic image is the final panoramic image.

According to an embodiment, without generating an additional panoramic image after generating the first panoramic image and until the final panoramic image is generated, the processor 360 may continuously obtain at least one image using at least one of the first camera 310 or the second camera 320 and generate the final panoramic image based on the first panoramic image and at least one image continuously obtained. The above-described examples are described below in detail with reference to FIG. 7.

Figure 7:
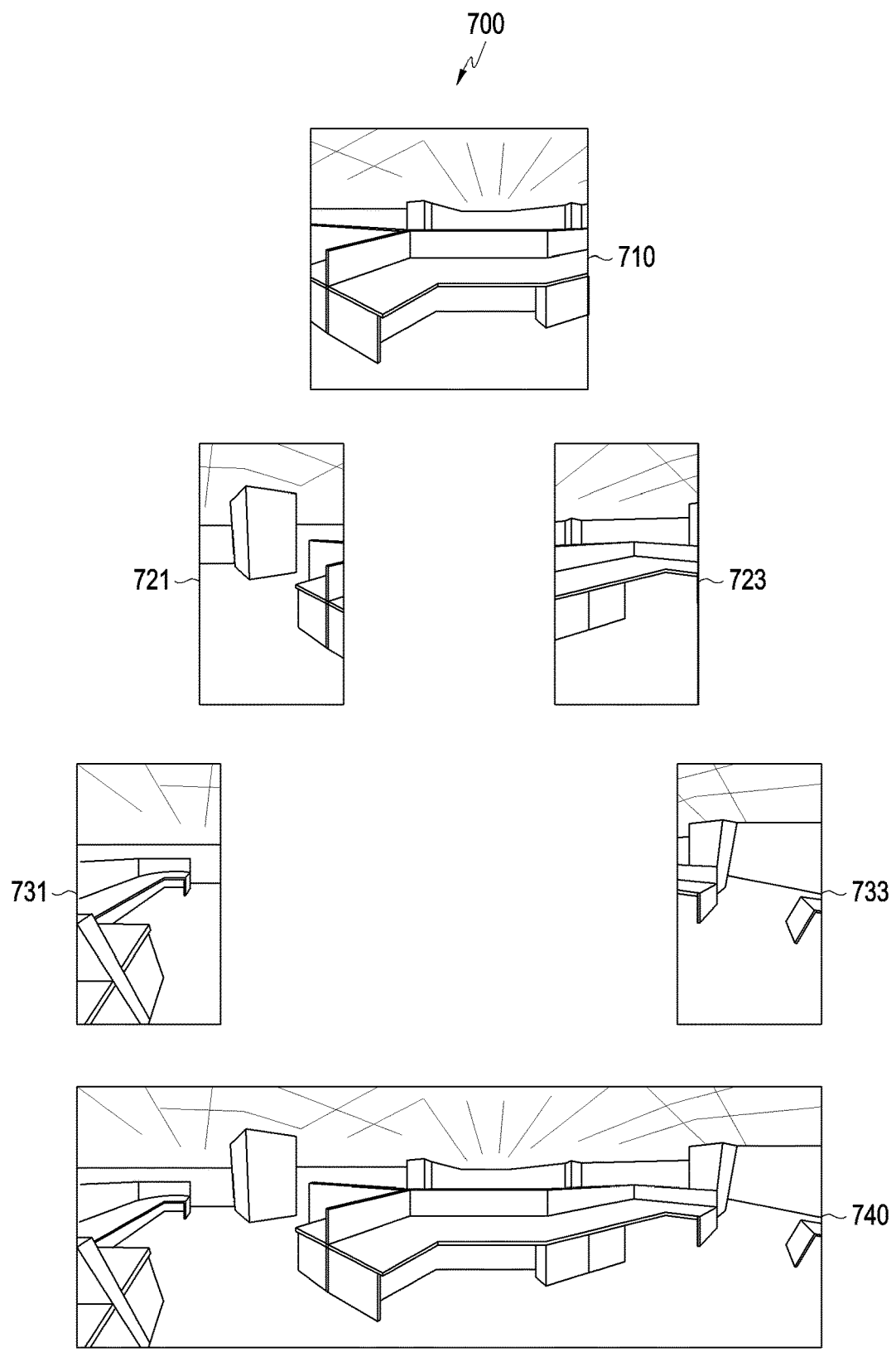
FIG. 7 is a view illustrating a method for generating a panoramic image according to an embodiment of the disclosure.

FIG. 7 is a view 700 illustrating a method for generating a panoramic image according to an embodiment of the disclosure.

Referring to FIG. 7, in an embodiment, after generating the first panoramic image 710, the processor 360 may obtain a 1-2th image 721 using the first camera 310 and a 2-2th image 723 using the second camera 320 as the change in folding angle becomes a designated angle. After obtaining the 1-2th image 721 and the 2-2th image 723, the processor 360 may obtain a 1-3th image 731 using the first camera 310 and a 2-3th image 733 using the second camera 320 as the change in folding angle becomes a designated angle. Upon receiving an input to terminate the operation of obtaining an image after obtaining the 1-3th image 731 and the 2-3th image 733, the processor 360 may generate a final panoramic image 740 based on the first panoramic image, the 1-2th image 721, the 1-3th image 731, the 2-2th image 723, and the 2-3th image 733.

Returning to FIG. 4, in an embodiment, the processor 360 may generate a final panoramic image by combining the first panoramic image and at least one image. For example, after generating the first panoramic image, the processor 360 may obtain the 1-2th image using the first camera 310 and the 2-2th image using the second camera 320. The processor 360 may generate a second panoramic image by combining (e.g., stitching) the first panoramic image, the 1-2th image, and the 2-2th image. The method for generating the second panoramic image by combining the first panoramic image, the 1-2th image, and the 2-2th image by the processor 360 is at least partially identical or similar to the method for generating the first panoramic image 530 by combining the 1-1th image 513 and the 2-1th image 523 described above in connection with FIG. 5, and no detailed description thereof is given below.

In an embodiment, the processor 360 may terminate the operation of obtaining an image based on a designated input. For example, in response to receiving a user input for terminating image acquisition, the processor 360 may terminate the image acquisition operation. As another example, the processor 360 may obtain an image while at least one of the first housing 210 or the second housing 220 is folded on the hinge unit and, upon detecting an unfolding of at least one of the first housing 210 or the second housing 220 on the hinge unit, terminate the image acquisition operation. As another example, when the first housing 210 and the second housing 220 are in a fully folded state, the processor 360 may terminate the operation of obtaining an image. However, the designated input for terminating image acquisition is not limited to the above-described examples.

In an embodiment, when image acquisition is terminated, the processor 360 may determine that the panoramic image generated immediately before image acquisition is terminated or the panoramic image generated before image acquisition is terminated is the final panoramic image. In an embodiment, when image acquisition is terminated, the processor 360 may generate a final panoramic image based on the first panoramic image and at least one image obtained after generating the first panoramic image.

According to an embodiment, when a final panoramic image is generated, the processor 360 may display the final panoramic image through the display 330.

In an embodiment, when a final panoramic image is generated, the processor 360 may store the generated final panoramic image in the memory 350.

Figure 8:
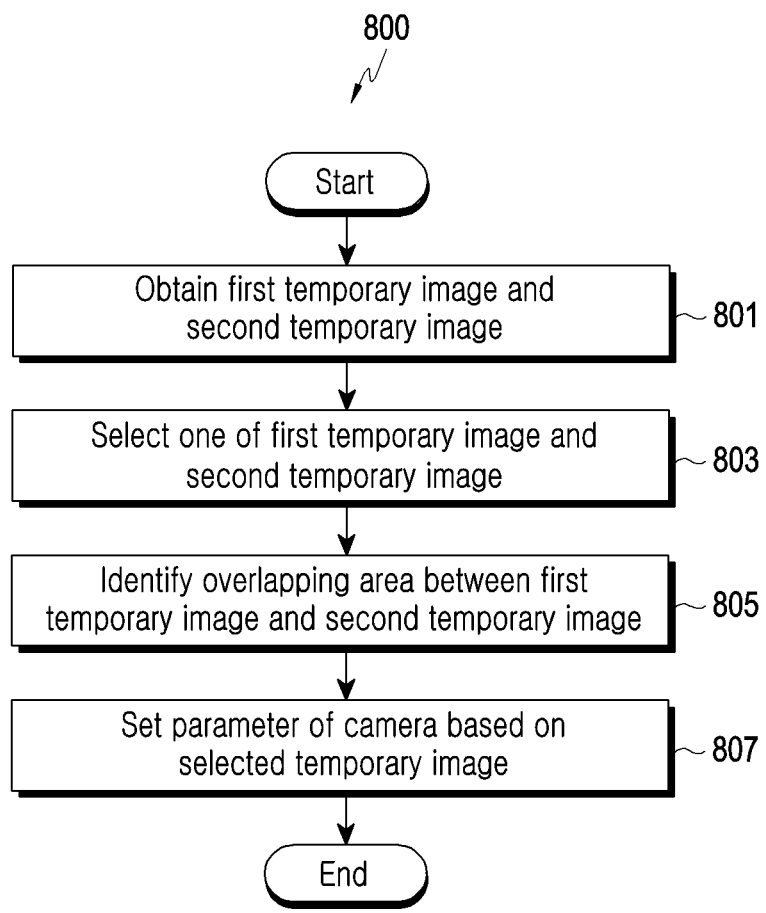
FIG. 8 is a flowchart illustrating a method for setting parameters of a camera according to an embodiment of the disclosure.

FIG. 8 is a flowchart 800 illustrating a method for setting parameters of a camera according to an embodiment of the disclosure.

According to an embodiment, operations related to setting parameters of a camera described below in connection with FIG. 8 may be performed before obtaining the 1-1th image and the 2-1th image using the first camera 310 and the second camera 320 in operation 401 of FIG. 4.

Referring to FIG. 8, in operation 801, according to an embodiment, the processor 360 may obtain a first temporary image (also referred to as a 'first test image') using the first camera 310 and a second temporary image (also referred to as a 'second test image') using the second camera 320.

According to an embodiment, upon receiving an input for generating a panoramic image from the user after the camera function is executed, the processor 360 may obtain the first temporary image using the first camera 310 and the second temporary image using the second camera 320. In an embodiment, the first temporary image and the second temporary image may be images that are obtained before obtaining the 1-1th image and the 2-1th image.

In operation 803, according to an embodiment, the processor 360 may select one of the first temporary image and the second temporary image.

In an embodiment, the processor 360 may select one of the first temporary image and the second temporary image based on a user input. For example, when the first temporary image and the second temporary image are obtained, the processor 360 may display the first temporary image and the second temporary image through the display 330. The processor 360 may receive an input for selecting one of the first temporary image and the second temporary image displayed through the display 330. The processor 360 may select one of the first temporary image and the second temporary image displayed through the display 330 based on the received input. By so doing, the user may select her desired one temporary image (e.g., the one which the user thinks has good quality) of the first temporary image and the second temporary image.

According to an embodiment, the processor 360 may automatically (e.g., based on a designated method) select one of the first temporary image and the second temporary image. For example, the processor 360 may select one of the first temporary image and the second temporary image based on the exposure value of the first temporary image and the exposure value of the second temporary image. The processor 360 may identify a histogram of the first temporary image and a histogram of the second temporary image. The processor 360 may identify the histogram, which is closer to a designated histogram (e.g., a histogram corresponding to proper exposure (e.g., a histogram in which the number of pixels having an intermediate brightness in a brightness range is larger than the number of pixels having a lower brightness and a higher brightness), of the histogram (e.g., a form of graph represented by the histogram) of the first temporary image and the histogram of the second temporary image. The processor 360 may select the temporary image having the identified histogram.

In operation 805, according to an embodiment, the processor 360 may identify an overlapping area between the first temporary image and the second temporary image. For example, the processor 360 may identify a first overlapping area, as an overlapping area in the first temporary image, and a second overlapping area, as an overlapping area in the second temporary image, based on the folding angle (e.g., the folding angle at the time of obtaining the first temporary image and the second temporary image), the field-of-view of the first camera 310, the field-of-view of the second camera 320, and the minimum distance between the first camera 310 and the folding axis (axis A), and the minimum distance between the second camera 320 and the folding axis.

In operation 807, according to an embodiment, the processor 360 may set parameters of the camera based on the selected temporary image.

In an embodiment, the processor 360 may identify the exposure value of the overlapping area of the selected temporary image. For example, when the first temporary image is selected of the first temporary image and the second temporary image, the processor 360 may analyze the histogram for the first overlapping area of the first temporary image, thereby identifying the exposure value of the first overlapping area.

According to an embodiment, the processor 360 may set parameters (e.g., the aperture value, shutter speed, or international organization for standardization (ISO)) for the camera which has captured (or has been used to obtain) the non-selected temporary image of the first camera 310 and the second camera 320 based on the exposure value of the overlapping area of the selected temporary image. For example, when the first temporary image is selected of the first temporary image and the second temporary image, the processor 360 may adjust the parameter of the second camera 320, which has obtained the second temporary image, so that the exposure value of the second overlapping area of the second temporary image has an exposure value corresponding to the exposure value of the first overlapping area of the first temporary image (e.g., identical to the exposure value of the first overlapping area).

In an embodiment, as described with reference to FIG. 8, the processor 360 may generate an enhanced panoramic image by adjusting the parameters of the camera. For example, the processor 360 may obtain a plurality of images with identical or similar attributes (e.g., brightness) via the first camera 310 and the second camera 320 by adjusting the parameters of the camera before obtaining a plurality of images necessary to generate a panoramic image. It is thus possible to reduce resource consumption for performing processing to allow a plurality of images to have the same or similar attributes after obtaining the plurality of images to generate a panoramic image.

Although not illustrated in FIG. 8, according to an embodiment, when the first camera 310 includes a plurality of 1-1th cameras, and the second camera 320 includes a plurality of 2-1th cameras, the processor 360 may select the first camera 310 and the second camera 320 having the same or similar camera properties from among the plurality of 1-1th cameras and the plurality of 2-1th cameras. For example, when the 1-2th camera is selected as the first camera 310 from among the plurality of 1-1th cameras, the processor 360 may select the camera having the aperture value identical to or most similar to the aperture value of the 1-2th camera from among the plurality of 2-1th cameras.

Although not illustrated in FIG. 8, according to an embodiment, when the first camera 310 includes a plurality of 1-1th cameras, and the second camera 320 includes a plurality of 2-1th cameras, the processor 360 may select the camera with the largest field-of-view, as the first camera 310, from among the plurality of 1-1th cameras and the camera with the largest field-of-view, as the second camera 320, from among the plurality of 2-1th cameras.

Although not shown in FIG. 8, according to an embodiment, the processor 360 may set the resolution of the first camera 310 and the second camera 320 to obtain images with the maximum resolution supported by the first camera 310 and the second camera 320 so as to generate a panoramic image.

Figure 9:
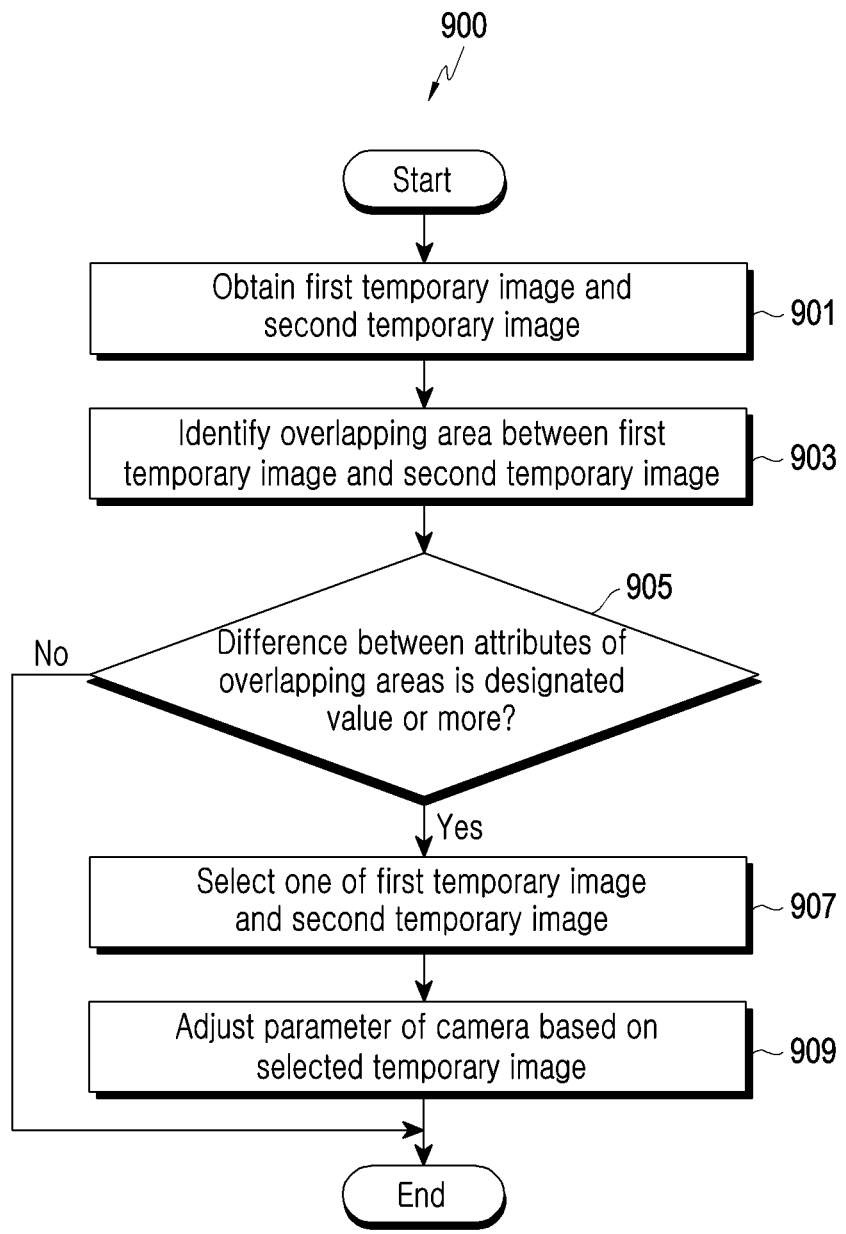
FIG. 9 is a flowchart illustrating a method for setting parameters of a camera according to an embodiment of the disclosure.

FIG. 9 is a flowchart 900 illustrating a method for setting parameters of a camera according to an embodiment of the disclosure.

Referring to FIG. 9, in operation 901, according to an embodiment, the processor 360 may obtain a first temporary image using the first camera 310 and a second temporary image using the second camera 320.

In operation 903, according to an embodiment, the processor 360 may identify an overlapping area between the first temporary image and the second temporary image.

Operations 901 and 903 are at least partially identical or similar to operations 801 and 805, respectively, of FIG. 8, and thus, no detailed description thereof is given below.

In operation 905, according to an embodiment, the processor 360 may determine whether a difference between attributes of the overlapping area is equal to or greater than a designated value.

For example, the processor 360 may identify an attribute (e.g., an exposure value) of a first overlapping area of the first temporary image and an attribute of a second overlapping area of the second temporary image. The processor 360 may determine whether the difference between the attribute of the first overlapping area and the attribute of the second overlapping area is greater than or equal to a designated value.

According to an embodiment, when the difference between the attribute of the first overlapping area and the attribute of the second overlapping area is smaller than the designated value, the processor 360 may maintain the parameter of the first camera 310 and the parameter of the second camera 320.

When the processor 360 determines that the difference between the attributes of the overlapping areas is equal to or greater than the designated value in operation 905, the processor 360 may select one of the first temporary image and the second temporary image in operation 907, according to an embodiment.

Example operations in which the processor 360 selects one of the first temporary image and the second temporary image in operation 907 are at least partially identical or similar to the embodiments of the operation of selecting one of the first temporary image and the second temporary image in operation 803 of FIG. 8, and no detailed description thereof is thus given below.

In operation 909, according to an embodiment, the processor 360 may adjust the parameter of the camera based on the selected temporary image.

Example operations in which the processor 360 adjusts the parameter of the camera based on the selected temporary image in operation 909 are at least partially identical or similar to the examples of the operation of setting the parameter of the camera based on the selected image in operation 807 of FIG. 8, and no detailed description thereof is given below.

Figure 10:
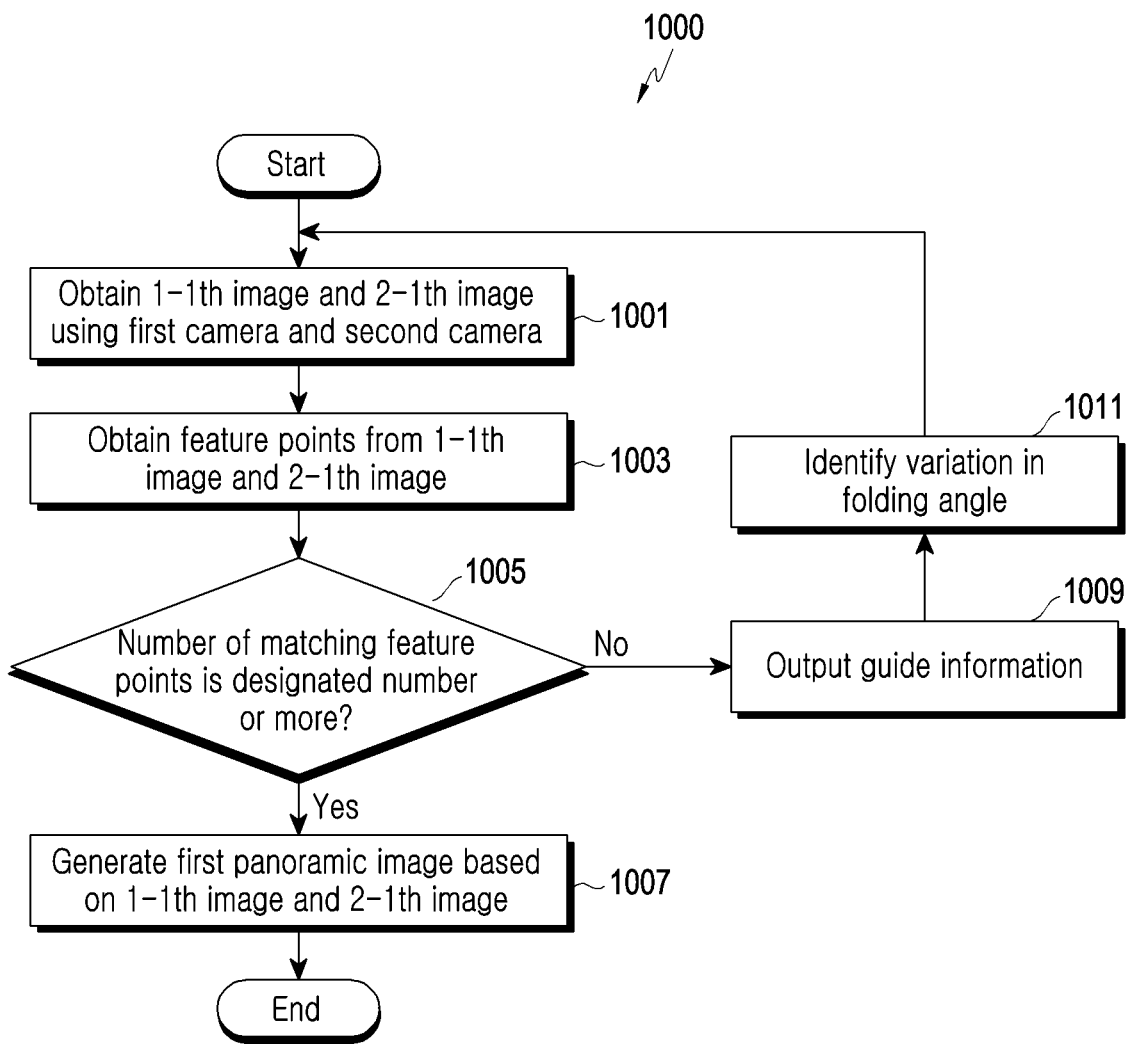
FIG. 10 is a flowchart illustrating a method for guiding an initial folding angle to provide a panoramic image according to an embodiment of the disclosure.

FIG. 10 is a flowchart 1000 illustrating a method for guiding an initial folding angle to provide a panoramic image according to an embodiment of the disclosure.

According to an embodiment, when the folding angle formed by the first housing 210 and the second housing 220 is a predetermined angle or less at the time of obtaining a 1-1th image and a 2-1th image to generate a first panoramic image (e.g., when the field-of-view of the first camera 310 does not overlap the field-of-view of the second camera 320), no overlapping area may exist between the 1-1th image and the 2-1th image. If there is no overlapping area between the 1-1th image and the 2-1th image, the processor 360 may generate no first panoramic image. Example methods for obtaining a 1-1th image and a 2-1th image having an overlapping area to generate a first panoramic image are described with reference to FIG. 10.

In operation 1001, according to an embodiment, the processor 360 may obtain the 1-1th image and the 2-1th image using the first camera 310 and the second camera 320.

For example, the processor 360 may obtain the 1-1th image using the first camera 310 and the 2-1th image using the second camera 320.

In operation 1003, according to an embodiment, the processor 360 may obtain feature points from the 1-1th image and the 2-1th image.

In operation 1005, according to an embodiment, the processor 360 may determine whether the number of matching feature points in the 1-1th image and the 2-1th image is equal to or greater than a designated number.

A method for obtaining feature points from the 1-1th image and the 2-1th image by the processor 360 and a method for determining whether the number of matching feature points in the 1-1th image and the 2-1th image is not less than a designated number are described below in detail with reference to FIG. 11.

Figure 11:
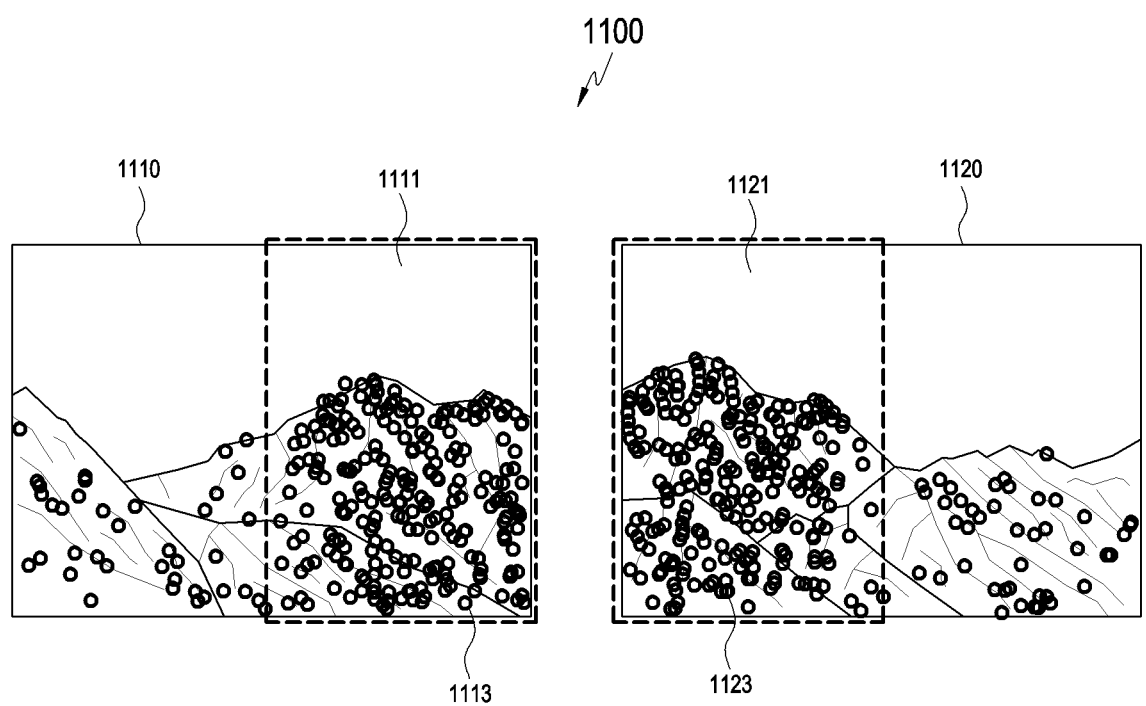
FIG. 11 is a view illustrating feature points in images according to an embodiment of the disclosure.

FIG. 11 is a view 1100 illustrating feature points in images according to an embodiment of the disclosure.

Referring to FIG. 11, according to an embodiment, the processor 360 may obtain (e.g., extract) feature points from each of the 1-1th image 1110 and 2-1th image 1120. For example, in FIG. 11, the processor 360 may obtain feature points represented as dots in each of the 1-1th image 1110 and 2-1th image 1120.

According to an embodiment, the processor 360 may identify matching feature points in the 1-1th image 1110 and the 2-1th image 1120 using an SIFT algorithm. For example, the processor 360 may identify that feature points 1113 in the first overlapping area 1111 of the 1-1th image 1110 match feature points 1123 in the second overlapping area 1121 of the 2-1th image 1120. However, the algorithm used to obtain matching feature points in the 1-1th image 1110 and the 2-1th image 1120 is not limited to the SIFT algorithm.

In an embodiment, the processor 360 may determine whether the number of matching feature points is a designated number (e.g., about 100) or more, based on the matched feature points.

Returning to FIG. 10, in operation 1007, according to an embodiment, when it is determined that the number of matching feature points is greater than or equal to the designated number in operation 1005, the processor 360 may generate a first panoramic image based on the 1-1th image and the 2-1th image.

The operation of generating a first panoramic image based on the 1-1th image and the 2-1th image in operation 1007 is at least partially identical or similar to the operation of generating a first panoramic image based on the 1-1th image and the 2-1th image as described above in connection with FIG. 4, and no detailed description thereof is given.

In operation 1009, according to an embodiment, when it is determined that the number of matching feature points is less than the designated number in operation 1005, the processor 360 may output guide information to instruct the user to rotate at least one of the first housing 210 or the second housing 220 on the hinge unit so that the folding angle between the first housing 210 and the second housing 220 is larger than the current folding angle. For example, the processor 360 may display, through the display 330, guide information to guide the user to turn at least one of the first housing 210 or the second housing 220 to a further unfolded state than the current state (or position) (e.g., increase the folding angle). However, the guide information displayed through the display 330 is not limited to the above-described example. As another example, the processor 360 may output the guide information as a voice or vibration to allow the user to turn at least one of the first housing 210 or second housing 220 to a further unfolded state than the current state.

In operation 1011, according to an embodiment, the processor 360 may identify that the folding angle is changed using the sensor 340. For example, the processor 360 may identify that the folding angle is changed using the first sensor.

According to an embodiment, when the processor 360 identifies that the folding angle is changed using the sensor 340, the processor 360 may re-perform the operation of obtaining the 1-1th image and the 2-1th image using the first camera 310 and the second camera 320 in operation 1001.

Figure 12:
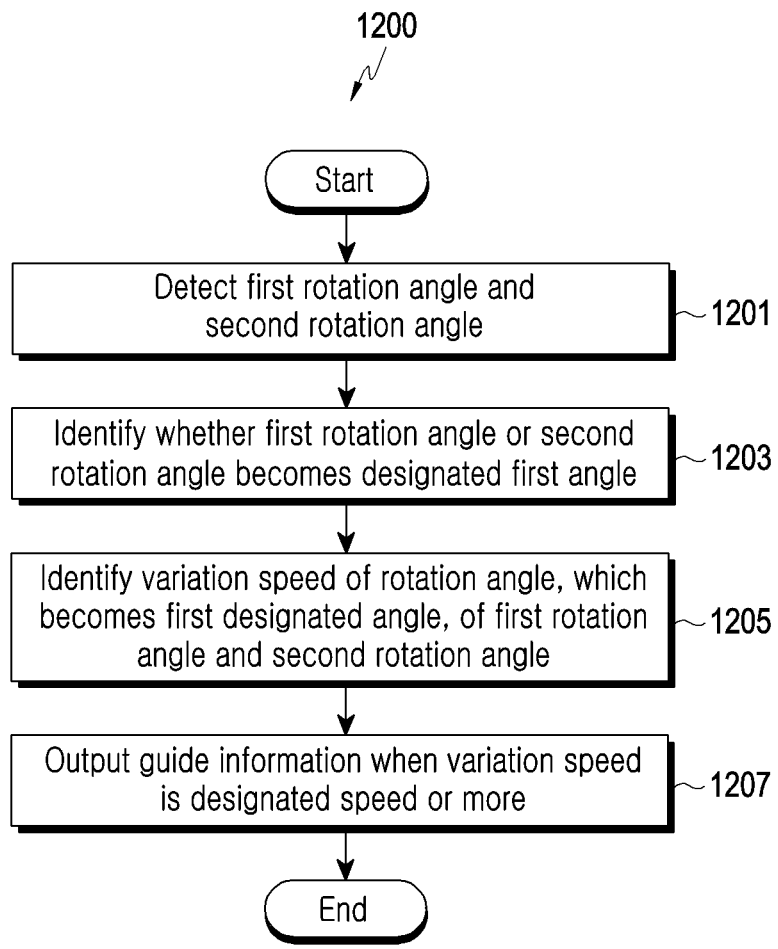
FIG. 12 is a flowchart illustrating a method for outputting guide information based on a rotation speed of a first housing or a second housing, according to an embodiment of the disclosure.

FIG. 12 is a flowchart 1200 illustrating a method for outputting guide information based on the rotation speed of a first housing 210 or a second housing 220 according to an embodiment of the disclosure.

In an embodiment, FIG. 12 may illustrate example operations performed after a first panoramic image is generated through operation 403 of FIG. 4.

Referring to FIG. 12, in operation 1201, according to an embodiment, the processor 360 may detect the first rotation angle of the first housing 210 and the second rotation angle of the second housing 220 using the sensor 340.

According to an embodiment, the processor 360 may detect the first rotation angle in which the first housing 210 has been rotated and the second rotation angle in which the second housing 220 has been rotated via the sensor 340 from the time when the first panoramic image is generated or from the time when the 1-1th image and the 2-2th image are obtained.

In operation 1203, according to an embodiment, the processor 360 may identify whether the first rotation angle or the second rotation angle becomes a designated first angle.

According to an embodiment, the processor 360 may identify whether the first rotation angle becomes the designated first angle as the first housing 210 is rotated or whether the second rotation angle becomes the designated first angle as the second housing 220 is rotated.

In operation 1205, according to an embodiment, the processor 360 may identify the change speed (e.g., angular speed) of the rotation angle which has become the designated first angle of the first rotation angle and the second rotation angle. For example, when the first rotation angle becomes identical to the designated first angle as the first housing 210 rotates, the processor 360 may identify the speed of the first rotation angle (e.g., the rotational angular speed of the first housing 210). As another example, when the second rotation angle becomes identical to the designated first angle as the second housing 220 rotates, the processor 360 may identify the speed of the second rotation angle.

In operation 1207, according to an embodiment, when the change speed of the rotation angle, which has become identical to the designated first angle, of the first rotation angle and the second rotation angle is a designated speed or more, the processor 360 may output guide information related to the housing which has been rotated at the designated speed or more. For example, when the change speed of the first rotation angle is the designated speed or more, the processor 360 may output guide information to allow the first housing 210 to rotate at a speed lower than the current rotation speed. As another example, when the change speed of the first rotation angle is the designated speed or more, the processor 360 may output information indicating that a blurred image may be obtained if image acquisition is performed using the first camera 310 while rotating the first housing 210 at the current rotation speed. However, the output guide information is not limited to the above-described examples.

Although not illustrated in FIG. 12, according to an embodiment, the processor 360 may identify the change speed of the rotation angle, which has become the designated first angle, of the first rotation angle and the second rotation angle whenever the first rotation angle or the second rotation angle becomes the designated first angle and, when the change speed of the rotation angle is the designated speed or more, output guide information. For example, as the first rotation angle becomes the designated first angle, the processor 360 may identify the change speed of the first rotation angle. The processor 360 may output guide information when the change speed of the first rotation angle is equal to or greater than the designated speed. When the first rotation angle becomes the designated first angle again (for example, when the first housing 210 is rotated by a designated first angle, and then the first housing 210 is again rotated by the designated first angle), the processor 360 may repeatedly perform the operation of identifying the change speed of the first rotation angle and the operation of outputting guide information when the change speed of the first rotation angle is the designated speed or more.

Although examples of identifying the change speed of the rotation angle, which becomes the first angle, whenever the first rotation angle or the second rotation angle becomes the designated first angle have been described above in connection with FIG. 12, embodiments of the disclosure are not limited thereto.

For example, the processor 360 may continuously (e.g., in real-time) identify the change speed (e.g., the rotational angular speed of the first housing 210) of the rotation angle of the first housing 210 and the change speed of the rotation angle of the second housing 220. When the change speed of the rotation angle of the first housing 210 or the change speed of the rotation angle of the second housing 220 is identified to be the designated speed or more, the processor 360 may output guide information related to the housing rotating at the designated speed or more.

Although not illustrated in FIG. 12, according to an embodiment, the processor may output guide information based on an image (e.g., based on a post processing operation of an image). For example, the processor may obtain an image using at least one of the first camera 310 or the second camera 320 while at least one of the first housing 210 or the second housing 220 rotates. The processor may analyze the obtained image. The processor 360 may identify a blur in the obtained image or a shake or distortion in the target object (e.g., the image portion for the subject). In such a case, the processor may output guide information (e.g., guide information to instruct to rotate at least one of the first housing 210 or the second housing 220 at a lower speed or guide information to instruct to recapture an image).

Figure 13:
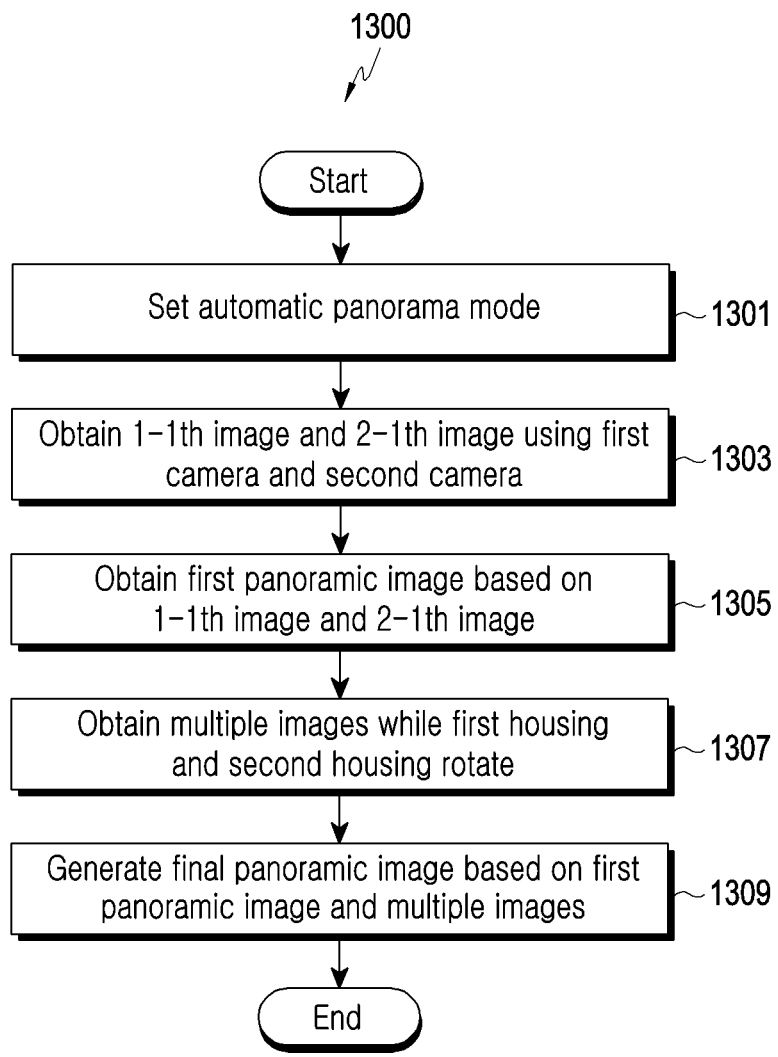
FIG. 13 is a flowchart illustrating a method for providing a panoramic image as a foldable housing is automatically rotated according to an embodiment of the disclosure.

FIG. 13 is a flowchart 1300 illustrating a method for providing a panoramic image as a foldable housing automatically rotates, according to an embodiment of the disclosure.

Referring to FIG. 13, in operation 1301, according to an embodiment, the processor 360 may set an automatic panorama mode.

According to an embodiment, the automatic panorama mode may denote a mode in which the first housing 210 and the second housing 220 are rotated by a driving unit (e.g., a motor) and, while the first housing 210 and the second housing 220 are rotated, a plurality of images are obtained via the first camera 310 and the second camera 320, and a panoramic image is generated based on the plurality of obtained images.

According to an embodiment, a manual panorama mode may denote a mode in which a plurality of images are obtained via at least one of the first camera 310 or the second camera 320 while at least one of the first housing 210 or the second housing 220 is rotated by the user, and a panoramic image is generated based on the plurality of obtained images.

In an embodiment, the processor 360 may select (e.g., set) the automatic panorama mode or the manual panorama mode based on a user input.

In operation 1303, according to an embodiment, the processor 360 may obtain the 1-1th image and the 2-1th image using the first camera 310 and the second camera 320. For example, in response to entry into the automatic panorama mode of the electronic device 101, the processor 360 may obtain the 1-1th image and the 2-1th image using the first camera 310 and the second camera 320.

In operation 1305, according to an embodiment, the processor 360 may generate a first panoramic image based on the 1-1th image and the 2-1th image.

The operation of generating a first panoramic image based on the 1-1th image and the 2-1th image in operation 1305 is at least partially identical or similar to the operation of generating a first panoramic image in operation 403 of FIG. 4, and no detailed description thereof is given.

In operation 1307, according to an embodiment, while the first housing 210 and the second housing 220 are rotated with respect to the hinge unit, the processor 360 may obtain a plurality of images using the first camera 310 and the second camera 320. For example, the processor 360 may obtain a plurality of images using the first camera 310 and the second camera 320 whenever the folding angle is changed by a designated angle.

In operation 1309, according to an embodiment, the processor 360 may generate a final panoramic image based on the first panoramic image and the plurality of images.

According to an embodiment, a method for providing a panoramic image by an electronic device 101 comprises obtaining a 1-1th image using a first camera 310 disposed in a first housing 210 of the electronic device and a 2-1th image using a second camera 320 disposed in a second housing 220 of the electronic device, the electronic device 101 including the first housing 210 and the second housing 220 rotated on a hinge unit and a display 330 exposed to an outside through the first housing 210 and the second housing 220, generating a first panoramic image based on the 1-1th image and the 2-1th image, detecting a rotation of at least one of the first housing 210 or the second housing 220 on the hinge unit using at least one sensor 340 of the electronic device, obtaining at least one image using at least one of the first camera 310 or the second camera 320 while the at least one housing rotates, and generating a second panoramic image based on the first panoramic image and the at least one image.

According to an embodiment, generating the first panoramic image may include identifying overlapping areas between the 1-1th image and the 1-2th image in the 1-1th image and the 1-2th image, and generating the first panoramic image based on the overlapping areas.

According to an embodiment, obtaining the at least one image may include obtaining a 1-2th image using the first camera 310 and a 2-2th image using the second camera 320 upon detecting that a folding angle formed between the first housing 210 and the second housing 220 is changed by a designated angle using the at least one sensor 340.

According to an embodiment, the method may further comprise setting the designated angle to allow a first overlapping area between the first panoramic image and the 1-2th image and a second overlapping area between the first panoramic image and the 2-2th image to have a designated size.

According to an embodiment, obtaining the at least one image may include obtaining the at least one image via a housing rotated by a designated angle, of the first housing 210 and the second housing 220, upon detecting that the first housing 210 or the second housing 220 is rotated on the hinge unit by the designated angle using the at least one sensor 340.

According to an embodiment, the method may further comprise obtaining a first temporary image using the first camera 310 and a second temporary image using the second camera 320, selecting one of the first temporary image and the second temporary image, and adjusting a setting of a camera obtaining a non-selected of the first temporary image and the second temporary image, of the first camera 310 and the second camera 320, to allow an attribute of the non-selected image of the first temporary image and the second temporary image to be identical to an attribute of the selected temporary image.

According to an embodiment, the method may further comprise obtaining feature points matched between the 1-1th image and the 2-1th image, and outputting information to guide to increase a folding angle formed between the first housing 210 and the second housing 220 to be larger than a current folding angle upon identifying that the number of the feature points is less than a predetermined number.

According to an embodiment, the method may further comprise detecting a rotation speed at which the first housing 210 or the second housing 220 rotates on the hinge unit, via the at least one sensor 340, and outputting information to guide to rotate a housing rotating at a speed higher than a designated speed, of the first housing 210 and the second housing 220, at a speed lower than a current rotation speed.

According to an embodiment, obtaining the at least one image may include obtaining at least one image using at least one of the first camera 310 and the second camera 320 while the first housing 210 and the second housing 220 are rotated by the driving unit.

According to an embodiment, the method may further comprise terminating obtaining the at least one image when the at least one housing is rotated in a direction opposite to the direction of the rotation on the hinge unit or when the first housing 210 and the second housing 220 are fully folded.

Further, the structure of the data used in embodiments of the disclosure may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a digital versatile disc (DVD)).

According to an embodiment, there may be provided a computer-readable recording medium storing programs executable on a computer, the programs executed by the computer to control obtaining a 1-1th image using a first camera 310 disposed in a first housing 210 of the electronic device and a 2-1th image using a second camera 320 disposed in a second housing 220 of an electronic device, the electronic device including the first housing 210 and the second housing 220 rotated on a hinge unit and a display 330 exposed to an outside through the first housing 210 and the second housing 220, generating a first panoramic image based on the 1-1th image and the 2-1th image, detecting a rotation of at least one of the first housing 210 or the second housing 220 on the hinge unit using at least one sensor 340 of the electronic device, obtaining at least one image using at least one of the first camera 310 or the second camera 320 while the at least one housing rotates, and generating a second panoramic image based on the first panoramic image and the at least one image.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a housing comprising a first housing comprising a first surface facing in a first direction and a second housing comprising a second surface facing in a second direction;
a hinge configured to rotate the first housing and the second housing;
a display exposed to an outside through the first surface and the second surface;
a first camera disposed in the first housing and configured to obtain an image through a third surface of the first housing facing in a direction opposite to the first direction;
a second camera disposed in the second housing and configured to obtain an image through a fourth surface of the second housing facing in a direction opposite to the second direction;
at least one sensor; and
at least one processor operatively connected to the display, the first camera, the second camera, and the at least one sensor,
wherein the at least one processor is configured to:
obtain a first image by using the first camera and a second image by using the second camera,
generate a first panoramic image based on the first image and the second image,
detect, by using the at least one sensor, a rotation of at least one of the first housing or the second housing through the hinge,
obtain, while the at least one housing rotates, at least one image by using at least one of the first camera or the second camera, and
generate a second panoramic image, based on the first panoramic image and the at least one image,
wherein the at least one processor is further configured to:
obtain feature points matched between the first image and the second image; and
based on identifying that a number of the feature points is less than a predetermined number, output information to guide an increase of a folding angle between the first housing and the second housing to be larger than a current folding angle such that a size of an overlapping area between the first image and the second image is increased without generating the first panoramic image,
wherein, when a rotation angle of the first housing is a designated angle or more, and the rotation angle of the second housing is less than the designated angle, the at least one image is obtained using the first camera without using the second camera, and wherein, when the rotation angle of the second housing is the designated angle or more, and the rotation angle of the first housing is less than the designated angle, at least one image is obtained using the second camera without using the first camera.

2. The electronic device of claim 1, wherein the at least one processor is further configured to:
   identify overlapping areas between the first image and the second image in the first image and the second image; and
   generate the first panoramic image, based on the overlapping areas.

3. The electronic device of claim 1, wherein the at least one processor is further configured to obtain a third image by using the first camera and a fourth image by using the second camera, based on detecting, using the at least one sensor, that the folding angle formed between the first housing and the second housing is changed by the designated angle.

4. The electronic device of claim 3, wherein the at least one processor is further configured to set the designated angle such that a first overlapping area between the first panoramic image and the third image and a second overlapping area between the first panoramic image and the fourth image have a designated size.

5. The electronic device of claim 1, wherein the at least one processor is further configured to obtain the at least one image by using a camera disposed in the housing rotated by the designated angle between the first housing and the second housing, based on detecting, by using the at least one sensor, that the first housing or the second housing is rotated through the hinge by the designated angle.

6. The electronic device of claim 1, wherein the at least one processor is further configured to:
   obtain a first temporary image by using the first camera and a second temporary image by using the second camera;
   select a temporary image from the first temporary image or the second temporary image; and
   adjust a setting of a camera, of the first camera or the second camera, obtaining a temporary image which is not selected from the first temporary image or the second temporary image, such that an attribute of the temporary image which is not selected is identical to an attribute of the selected temporary image.

7. The electronic device of claim 1, wherein the at least one processor is further configured to:
   detect, by using the at least one sensor, a rotation speed at which the first housing or the second housing rotates through the hinge; and
   output information to guide rotation of a housing, rotating at a speed higher than a designated speed, from the first housing or the second housing, to rotate at a speed lower than a current rotation speed.

8. The electronic device of claim 1, further comprising:
   a driver configured to rotate the first housing and the second housing,
   wherein the at least one processor is further configured to obtain at least one image using at least one of the first camera or the second camera while the first housing and the second housing are rotated by the driver.

9. The electronic device of claim 1, wherein the at least one processor is further configured to end obtaining the at least one image when the at least one housing is rotated in a direction opposite to a direction of the detected rotation or when the first housing and the second housing are fully folded.

10. A method for providing a panoramic image in an electronic device, the method comprising:
    obtaining a first image by using a first camera disposed in a first housing of the electronic device and a second image by using a second camera disposed in a second housing of the electronic device, the electronic device comprising the first housing and the second housing rotated on a hinge and a display exposed to an outside through the first housing and the second housing;
    generating a first panoramic image based on the first image and the second image;
    detecting, by using at least one sensor of the electronic device, a rotation of at least one of the first housing or the second housing through the hinge;
    obtaining at least one image by using at least one of the first camera or the second camera while the at least one housing rotates; and
    generating a second panoramic image based on the first panoramic image and the at least one image,
    wherein the method further comprises:
       obtaining feature points matched between the first image and the second image; and
       based on identifying that a number of the feature points is less than a predetermined number, outputting information to guide an increase of a folding angle between the first housing and the second housing to be larger than a current folding angle such that a size of an overlapping area between the first image and the second image is increased without generating the first panoramic image,
    wherein, when a rotation angle of the first housing is a designated angle or more, and the rotation angle of the second housing is less than the designated angle, the at least one image is obtained using the first camera without using the second camera, and
    wherein, when the rotation angle of the second housing is the designated angle or more, and the rotation angle of the first housing is less than the designated angle, at least one image is obtained using the second camera without using the first camera.

11. The method of claim 10, wherein the generating of the first panoramic image comprises:
    identifying overlapping areas between the first image and the second image in the first image and the second image; and
    generating the first panoramic image based on the overlapping areas.

12. The method of claim 10, wherein the obtaining of the at least one image comprises obtaining a third image by using the first camera and a fourth image by using the second camera, based on detecting, using the at least one sensor, that the folding angle between the first housing and the second housing is changed by the designated angle.

13. The method of claim 12, further comprising setting the designated angle such that a first overlapping area between the first panoramic image and the third image and a second overlapping area between the first panoramic image and the fourth image have a designated size.

14. The method of claim 10, wherein the obtaining of the at least one image comprises obtaining the at least one image by using a camera disposed in a housing rotated by the designated angle between the first housing and the second housing, based on detecting, by using the at least one sensor, that the first housing or the second housing is rotated through the hinge by the designated angle.

15. The method of claim 10, further comprising:
obtaining a first temporary image by using the first camera and a second temporary image by using the second camera;
selecting a temporary image from the first temporary image or the second temporary image; and
adjusting a setting of a camera, of the first camera or the second camera, obtaining a temporary image which is not selected from the first temporary image or the second temporary image, such that an attribute of the temporary image which is not selected is identical to an attribute of the selected temporary image.

16. The method of claim 10, further comprising:
detecting, by using the at least one sensor, a rotation speed at which the first housing or the second housing rotates through the hinge; and
outputting information to guide rotation of a housing, rotating at a speed higher than a designated speed, from the first housing or the second housing, to rotate at a speed lower than a current rotation speed.

17. The method of claim 10, wherein the obtaining of the at least one image comprises obtaining the at least one image by using at least one of the first camera or the second camera while the first housing and the second housing are rotated by a driver.

* * * * *